United States Patent
Lewis

(10) Patent No.: US 10,370,257 B2
(45) Date of Patent: Aug. 6, 2019

(54) HIGH CHARGE DENSITY METALLOALUMINOPHOSPHOSILICATE MOLECULAR SIEVES

(71) Applicant: UOP LLC, Des Plaines, IL (US)

(72) Inventor: Gregory J. Lewis, Santa Cruz, CA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/593,209

(22) Filed: May 11, 2017

(65) Prior Publication Data

US 2017/0341948 A1 Nov. 30, 2017

Related U.S. Application Data

(60) Provisional application No. 62/341,281, filed on May 25, 2016.

(51) Int. Cl.
*C01B 39/54* (2006.01)
*B01J 29/80* (2006.01)
(Continued)

(52) U.S. Cl.
CPC .............. *C01B 39/54* (2013.01); *B01J 29/80* (2013.01); *B01J 29/84* (2013.01); *B01J 29/85* (2013.01);
(Continued)

(58) Field of Classification Search
CPC ......... C01B 39/54; B01J 29/84; B01J 20/048; B01J 29/80; B01J 29/85; C01P 2002/72; C01P 2002/77; C01P 2002/78
See application file for complete search history.

(56) References Cited

U.S. PATENT DOCUMENTS

| | | | |
|---|---|---|---|
| 3,443,892 A | 5/1969 | Wacks et al. | |
| 4,310,440 A * | 1/1982 | Wilson | B01J 20/0292 208/112 |

(Continued)

OTHER PUBLICATIONS

Feng et al. (Hydrothermal syntheses and structural characterization of zeolite analogue compounds based on cobalt phosphate, Nature, 1997, vol. 388, pp. 735-740). (Year: 1997).*

(Continued)

*Primary Examiner* — David M Brunsman

(57) ABSTRACT

A new family of crystalline microporous metalloalumino (gallo)phosphosilicate molecular sieves has been synthesized and are designated high charge density (HCD) MeAPSOs. These metalloalumino(gallo)phosphosilicate are represented by the empirical formula of:

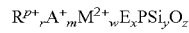

where A is an alkali metal such as potassium, R is at least one quaternary ammonium cation such as ethyltrimethylammonium, M is a divalent metal such as Zn and E is a trivalent framework element such as aluminum or gallium. This family of metalloalumino(gallo)phosphosilicate materials are stabilized by combinations of alkali and quaternary ammonium cations, enabling unique, high charge density compositions. The HCD MeAPSO family of materials have catalytic properties for carrying out various hydrocarbon conversion processes and separation properties for separating at least one component.

16 Claims, 3 Drawing Sheets

| Point | x (Al) | y (Me²⁺) | z(P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 |

(51) Int. Cl.
*B01J 29/84* (2006.01)
*B01J 37/00* (2006.01)
*B01J 37/04* (2006.01)
*B01J 37/10* (2006.01)
*B01J 29/85* (2006.01)
*B01J 20/04* (2006.01)

(52) U.S. Cl.
CPC .............. *B01J 37/009* (2013.01); *B01J 37/04* (2013.01); *B01J 37/10* (2013.01); *B01J 20/048* (2013.01); *C01P 2002/70* (2013.01); *C01P 2002/72* (2013.01); *C01P 2002/77* (2013.01); *C01P 2002/78* (2013.01); *Y02P 30/42* (2015.11)

(56) References Cited

U.S. PATENT DOCUMENTS

| | | | |
|---|---|---|---|
| 4,319,440 A | 3/1982 | Rassias et al. | |
| 4,440,817 A * | 4/1984 | Ahlm | A47C 27/005 428/316.6 |
| 4,440,871 A | 4/1984 | Lok et al. | |
| 4,567,029 A | 1/1986 | Wilson et al. | |
| 4,870,222 A | 9/1989 | Bakas et al. | |
| 4,973,785 A * | 11/1990 | Lok | B01J 29/85 208/111.05 |
| 5,126,120 A | 6/1992 | Bedard | |
| 5,126,308 A | 6/1992 | Barger et al. | |
| 5,152,972 A | 10/1992 | Gier | |
| 5,157,196 A | 10/1992 | Crossland et al. | |
| 5,157,197 A | 10/1992 | Cooper et al. | |
| 5,302,362 A | 4/1994 | Bedard | |
| 6,776,975 B2 | 8/2004 | Wilson et al. | |
| 7,578,993 B2 | 8/2009 | Lewis et al. | |
| 8,696,886 B1 | 4/2014 | Lewis et al. | |
| 8,697,927 B1 | 4/2014 | Lewis et al. | |
| 8,871,177 B2 * | 10/2014 | Lewis | C01B 39/54 423/705 |
| 8,871,178 B2 * | 10/2014 | Lewis | C01B 39/54 423/277 |
| 8,911,704 B2 * | 12/2014 | Lewis | C07F 19/00 423/305 |
| 8,936,776 B2 * | 1/2015 | Lewis | C01B 39/54 423/277 |
| 2014/0193327 A1 | 7/2014 | Casci et al. | |

OTHER PUBLICATIONS

G. H. Kuhl, Inorganic Chemistry, 10, 1971, p. 2488.
Murakami et al. Proc. of 7th Int. Zeolite Conf., (Elsevier Amsterdam 1986), p. 103-112.
Gatter, Stability of framework aluminum in the new zeolite UZM-5, Surface Science, (2004) vol. 154, p. 1324-1331.
Park et al., Zeolite Synthesis from a Charge Density Perspective: The Charge Density Mismatch Synthesis of UZM-5 and UZM-9, Chem. Mater. 2014, 26, 6684-6694.
Akolekar, Novel, crystalline, large-pore magnesium aluminophosphate molecular sieve of type 50: Preparation, characterization, and structural stability, Zeolites, 1995, 15, 583-590.
Cowley et al., CGS: cobalt and zinc gallophosphates with a new open-framework topology, Microporous and Mesoporous Materials 1999, 28, 163-172.
Harrison et. al, Chemistry of materials 1991, 3, 27-29.
Sena et al., Influence of framework composition over SAPO-34 and MeAPSO-34 acidity,Applied Catalysis A: General 2011 406, 59-62.
Broach et al., New ABC-6 net molecular sieves ZnAPO-57 and ZnAPO-59: Framework charge density-induced transition from two-to three-dimensional porosity, Microporous and Mesoporous Materials, 189, 2014, 49-63.
Search Report dated Aug. 24, 2017 for corresponding PCT Appl. No. PCT/US2017/032882.

* cited by examiner

| Point | x (Al) | y (Me²⁺) | z(P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 |

| Boundary Points and Planes | |
|---|---|
| Points | Plane Equations |
| 1,2,3,4 | $y = 0.001502$ |
| 5,6,7,8 | $x + y + z = 0.996016$ |
| 4,5,6 | $1.239*x + 0.065*y + 1.004*z = 1$ |
| 1,4,5 | $x + 2.274*y - 1.25*z = 0$ |
| 1,5,7 | $18.471*x + 18.471*y - 16.463*z = 1$ |
| 1,7,8 | $4.599*x + 0.6046*y + 1.004*z = 1$ |
| 1,2,8 | $1.004*x - 2.341*y + 5.519*z = 1$ |
| 2,3,8 | $x + 2.86*y - 4.00*z = 0$ |
| 3,4,6 | $10.009*x + 0.9653*y + 0.2502*z = 5$ |
| 3,6,8 | $2.212*x + 2.212*y - 0.808*z = 1$ |

HIGH CHARGE DENSITY METALLOALUMINOPHOSPHOSILICATE MOLECULAR SIEVES

CROSS-REFERENCE TO RELATED APPLICATION

This application claims priority from Provisional Application No. 62/341,281 filed May 25, 2016, the contents of which cited application are hereby incorporated by reference in its entirety.

FIELD OF THE INVENTION

This invention relates to a new family of high charge density metalloalumino(gallo)-phosphosilicate-based molecular sieves. They are represented by the empirical formula:

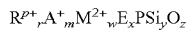

$$R^{p+}_r A^+_m M^{2+}_n E_x PSi_y O_z$$

where A is an alkali metal such as potassium, M is a divalent metal such as $Zn^{2+}$, R is a least one quaternary ammonium cation such as ethyltrimethylammonium and E is a trivalent framework element such as aluminum or gallium. The high charge density metalloalumino(gallo)phosphosilicate molecular sieves, designated HCD MeAPSO, often exhibit "Si islands."

BACKGROUND OF THE INVENTION

Zeolites are crystalline aluminosilicate compositions which are microporous and which are formed from corner sharing $[AlO_{4/2}]^-$ and $SiO_{4/2}$ tetrahedra. Numerous zeolites, both naturally occurring and synthetically prepared are used in various industrial processes. Synthetic zeolites are prepared via hydrothermal synthesis employing suitable sources of Si, Al and structure directing agents (SDAs) such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces of the zeolite as well as on internal surfaces within the pores of the zeolite.

In 1982, Wilson et al. developed aluminophosphate molecular sieves, the so-called AlPOs, which are microporous materials that have many of the same properties of zeolites, but are silica free, composed of $[AlO_{4/2}]^-$ and $[PO_{4/2}]^+$ tetrahedra (See U.S. Pat. No. 4,319,440). Subsequently, charge was introduced to the neutral aluminophosphate frameworks via the substitution of $SiO_{4/2}$ tetrahedra for $[PO_{4/2}]^-$ tetrahedra to produce the SAPO molecular sieves (See U.S. Pat. No. 4,440,871). Another way to introduce framework charge to neutral aluminophosphates is to substitute $[M^{2+}O_{4/2}]^{2-}$ tetrahedra for $[AlO_{4/2}]^-$ tetrahedra, which yield the MeAPO molecular sieves (see U.S. Pat. No. 4,567,029). These MeAPO materials generally showed low substitution levels of $M^{2+}$ for $Al^{3+}$, generally on the order of 10%, while several materials, notably MeAPO-44 exhibited $M^{2+}$ for $Al^{3-}$ substitution levels of 40%. Later, MeAPO-50 also showed nearly 40% substitution of $M^{2-}$ for $Al^{3+}$, but these examples of high $Me^{2-}$ substitution were few (See ZEOLITES, 1995, 15, 583-590). It is furthermore possible to introduce framework charge on AlPO-based molecular sieves via the introduction both of $SiO_{4/2}$ and $[M^{2+}O_{4/2}]^{2-}$ tetrahedra to the framework, giving MeAPSO molecular sieves (See U.S. Pat. No. 4,973,785).

Before the SAPO materials of U.S. Pat. No. 4,440,871 were known, there were attempts to make "phosphate zeolites," i.e., substitution of phosphorus for silicon in an aluminosilicate. Such a substitution in an aluminosilicate zeolite, $[PO_{4/2}]^+$ for $[SiO_{4/2}]$, represents a reduction of the negative charge on an aluminosilicate framework. The initial work by Flanigen and Grose co-precipitated the components of silicoaluminophosphate gels, isolated the resulting solid, suspended the resulting solids in alkali hydroxide solutions and treated them under hydrothermal conditions, yielding a series of phosphate zeolites, including those of LTL, CHA, LTA, and GIS topologies (See E. M. Flanigen and R. W. Grose, ADVANCES IN CHEMISTRY Series No. 101, ACS, Washington D.C., 1971). The low phosphate preparations, P/Al≤1.1, resulted in alkali silicoaluminophosphate species that were not as thermally stable as their aluminosilicate analogs, often less than 350° to 400° C., and reduced adsorption capacity in some cases suggest the possibility of some occluded phosphate in pores and cages. Similarly, Wacks et al. disclose a process for preparing silicoaluminophosphate zeolites that entails digesting hydrated aluminophosphate solids in the presence of sodium silicate solutions to make the desired silicoaluminophosphate materials, in which the claimed range of phosphate incorporation was given by $P_2O_5/Al_2O_3=0-0.2$, suggesting that Al/P≥5 in these materials (See K. Wacks et al., U.S. Pat. No. 3,443,892). While eight examples of this zeolite synthesis process are disclosed in U.S. Pat. No. 3,443,892, there is no data offered that shows that any P was actually incorporated into the zeolite product; a possibility given the claimed range extends to zero. Many attempts to make silicoaluminophosphate zeolites resembled reactions that would be used to make aluminosilicate zeolites, but carried out in the presence of phosphate, yielding little phosphate incorporation. Kuhl conducted syntheses of silicoaluminophosphate compositions, employing high levels of both phosphate and hydroxide, utilizing a combination of tetramethylammonium and sodium hydroxides for the latter, to make the LTA-related species ZK-21 and ZK-22 (See G. H. Kuhl, INORGANIC CHEMISTRY, 10, 1971, p. 2488). These species exhibit low phosphate incorporation, Al/P>8.9, and it was concluded that the phosphate was occluded in zeolitic cages rather than incorporated into the framework. Casci et al. disclose low phosphate chabazite materials in which the framework phosphorus is claimed to be between 0.05-5 mole %, i.e., P/(Al+Si+P)=0.0005-0.05 (See US 2014/0193327). The amount of phosphate employed in the reaction mixtures of the examples is low (Al/P>5.5) and no data is offered in the examples to show what the P incorporation actually is. An outlier disclosed in the SAPO patent (U.S. Pat. No. 4,440, 871) uses some sodium aluminate, tetramethylammonium hydroxide and low phosphate (P/Al=0.4) to prepare SAPO-42 (Example 48), which has the LTA topology and a composition similar to that of ZK-21 and ZK-22 mentioned above as Al/P>10. The SAPO-42 product is described in the application by an essential formulation that does not include alkali, since U.S. Pat. No. 4,440,871 only covers compositions of the formulation $mR:(Si_xAl_yP_z)O_2$. This patent application also discloses the synthesis of SAPO-20 from the same reaction mixture treated at higher temperature (Example 28). The SAPO-20 product, which has the SOD topology, is not porous, but has a slightly enhanced P content as Al/P=3.17. For many years now, a large gap has been present in the known compositions of microporous silicoaluminophosphates, between the SAPOs disclosed in U.S. Pat. No. 4,440,871 and what are essentially the "phosphate zeolites" reviewed above. In particular, the materials of intermediate silicon and phosphorus levels are missing. These are materials of intermediate charge density, of higher charge density than the SAPOs originating from low level substitution of Si into neutral AlPOframeworks, but lower charge density than the phosphate zeolites.

A similar charge density gap exists for MeAPO-based materials. In the early 1990's, high charge density $Me^{2+}$—P—O based molecular sieves, similar to the MeAPOs of U.S. Pat. No. 4,567,029 but without the Al, were developed by Bedard (See U.S. Pat. No. 5,126,120) and Gier (See U.S. Pat. No. 5,152,972). These metal phosphates (sometimes arsenates, vanadates) were based on $M^{2+}$ (M=Zn, Co), the general formula of which, in terms of the T-atoms, $T^{2+}$-$T^{5+}$, was approximately $A^+T^{2+}T^{5+}O_4$, having framework charge densities similar to Si/Al=1 zeolites and were charge balanced by alkali cations, $A^+$, in the pores. Later attempts to prepare metallophosphates of similar compositions but with organic SDAs led to porous, but interrupted structures, i.e., the structures contained terminal P—O—H and Zn—N bonds (See J. MATER. CHEM., 1992, 2(11), 1127-1134). Attempts at Al substitution in a zincophosphate network was carried out in the presence of both alkali and quaternary ammonium agents, specifically the most highly charged quaternary ammonium species, tetramethylammonium, but because of the high framework charge density, only the alkali made it into the pores to balance framework charge (See U.S. Pat. No. 5,302,362). Similarly, in a high charge density zincophosphate system that yielded the zinc phosphate analog of zeolite X, the synthesis in the presence of $Na^+$ and $TMA^+$ yielded a product that contained considerably less $TMA^+$ than $Na^+$) (See CHEM. MATER., 1991, 3, 27-29).

To bridge the rather large charge density gap between the MeAPOs of U.S. Pat. No. 4,567,029 and the aforementioned alkali-stabilized $Me^{2+}$-phosphates of Bedard and Gier, Stucky's group developed a synthesis route using amines, often diamines in ethylene glycol. They were able to make high charge density, small pore MeAPOs in which the concentrations of $Co^{2+}$ and $Al^{3+}$ in $R(Co_xAl_{1-x})PO_4$ were varied such that $0.33 \le x \le 0.9$ in the so-called ACP series of materials, the aluminum cobalt phosphates (See NATURE, 1997, 388, 735). Continuing with this synthesis methodology utilizing ethylene glycol reaction mixtures and matching the amines to framework charge densities for $R(M^{2+}_xAl_{1-x})PO_4$ such that $0.4 \le x \le 0.5$, ($M^{2+}$=$Mg^{2+}$, $Mn^{2+}$, $Zn^{2+}$, $Co^{2+}$), the large pore materials UCSB-6, -8 and -10 were isolated (See Science, 1997, 278, 2080). Similarly, this approach also yielded MeAPO analogs of zeolite rho of the composition where $RM^{2+}_{0.5}Al_{0.5}PO_4$, where R=N,N'-diisopropyl-1,3-propanediamine, $M^{2+}$=$Mg^{2+}$, $Co^{2+}$ and $Mn^{2+}$. Cowley followed this ethylene glycol-based approach, which he described as "predominantly non-aqueous solvothermal conditions" to synthesize a high charge density CoGaPO-5, $(DABCO)_2[Co_4Ga_5P_9O_{36}]$, with the DABCO SDA (See ZEOLITES, 1997, 18, 176-181). Cowley also utilized this strategy to prepare cobalt and zinc gallium phosphates using quinuclidine as the SDA, one of which has the CGS topology with a framework charge density of $-0.125$/T-atom (See MICROPOROUS AND MESOPOROUS MATERIALS 1999, 28, 163-172).

Similarly, Lin and Wang used 1,2 diaminocyclohexane (DACH) with the ethylene glycol approach to prepare a Zn—Ga phosphate of CGS topology with higher Zn incorporation than the Cowley work, realizing a framework charge density of $-0.25$/T-atom for $(H_2DACH)Zn_2Ga_2(PO_4)_4$ (See CHEMISTRY OF MATERIALS, 2000, 12, 3617-3623). The reliance of this non-aqueous synthesis approach on ethylene glycol solvent does not lend itself well to industrial scale, from both a safety and environmental point of view. This non-aqueous approach also leads to very large crystals, often with dimensions of hundreds of microns, which are too large for industrial use, where µ-sized or smaller crystals are often preferred (See SCIENCE, 1997, 278, 2080). Other than this work cited here, there has been little activity in this intermediate charge density region, where $0.2 \le x \le 0.9$ for the $[M^{2+}_xAl_{1-x}PO_4]^{x-}$ compositions.

Pursuing aqueous chemistry, Wright used highly charged triquaternary ammonium SDAs to make new MeAPO materials (See CHEM. MATER., 1999, 11, 2456-2462). One of these materials, STA-5 with the BPH topology, $(Mg_{2.1}Al_{11.9}P_{14}O_{28})$, exhibited significant substitution of $Mg^{2+}$ for $Al^{3+}$, up to about 15%, but less substitution than seen in Stucky's non-aqueous ethylene glycol approach.

Unlike the SAPO and MeAPO chemistry discussed in the previous paragraphs, there has been far less investigation in the MeAPSO compositional arena, perhaps because of the complicated nature of this 4-component class of materials. The MeAPO and SAPO materials already consist of 3 T-atom components derived from substitution of $Me^{2+}$ or Si into AlPO-based frameworks, respectively. In the prior art, the addition of the fourth T-atom component, either Si or $Me^{2+}$, has generally been a perturbation of an existing MeAPO or SAPO material. Flanigen et al. review aluminophosphate molecular sieves and the periodic table and discuss the elements that may be substituted into AlPO-based frameworks along with the elements that have been incorporated in 22 different AlPO-based topologies (See Y. Murakami, A. Lijima, J. W. Ward (Eds.), Proc. of $7^{th}$ Int. Zeolite Conf., (Elsevier Amsterdam 1986), p. 103-112). In each case where a MeAPSO composition exists, there is also an AlPO, SAPO, or MeAPO composition except for MeAPSO-46, which was actually found first as a MeAPSO composition, but later found in a MeAPO composition with the same SDA, di-isopropylamine (See J. CHEM. SOC., Faraday Trans., 1993, 89, 4141-4147). There are many examples of MeAPSO compositions that are derivatives of previously known MeAPO or SAPO compositions, for instance MeAPSO-34, the derivatives often prepared to see the effects on catalytic and other material properties (See APPLIED CATALYSIS A, General 2011 406, 59-62). The MeAPSO compositions, however, have not been the focus of new exploratory synthesis. For instance, the attempts to make higher charge density metalloaluminophosphates by Stucky, Cowley and others discussed above have not been extended to MeAPSO compositions. Hence, more than the MeAPOs and SAPOs discussed above, there is a lack of MeAPSO compositions of intermediate to high charge density, in other words, MeAPSOs that contain significant amounts of $Me^{2+}$, $Si^{4+}$, or both, above the minor to modest substitution levels described in U.S. Pat. No. 4,973,785. In short, the compositions of MeAPSO materials have not progressed from what was disclosed in U.S. 4,973,785.

More recently, Lewis et al. developed aqueous solution chemistry leading to higher charge density SAPO, MeAPO, and MeAPSO materials, enabling greater substitution of $SiO_{4/2}$ and $[M^{2+}O_{4/2}]^{2-}$ into the framework for $[PO_{4/2}]^+$ and $[AlO_{4/2}]^-$, respectively, using the ethyltrimethylammonium (ETMA⁺) and diethyldimethylammonium (DEDMA⁺) SDAs. These materials include MeAPO, SAPO, and MeAPSO versions of ZnAPO-57 (U.S. Pat. No. 8,871,178), ZnAPO-59 (U.S. Pat. No. 8,871,177) and ZnAPO-67 (U.S. Pat. No. 8,697,927), as well as the species MeAPSO-64 of BPH topology (U.S. Pat. No. 8,696,886), which was not realized as a MeAPO or SAPO composition with these SDAs. The relationship between the increasing product framework charge densities and reaction parameters, namely the ETMAOH(DEDMAOH)/$H_3PO_4$ ratios, were outlined in the literature (See MICROPOROUS AND MESOPOROUS MATERIALS, 189, 2014, 49-63).

Applicants have now synthesized a new family of high charge density metalloalumino(gallo)phosphosilicate framework molecular sieves. These materials exhibit higher charge densities than the MeAPSOs mentioned in U.S. Pat. No. 4,973,785, most notably containing either more $Me^{2+}$, more $Si^{4+}$ or both. The high charge density (HCD) MeAPSOs of this invention are synthesized in a mixed quaternary ammonium/alkali SDA system, for example $ETMA^+/K^+$. The utilization of alkali in AlPO-based systems is uncommon and is required here to achieve the higher charge density and higher $Me^{2+}$ and $Si^{4+}$ incorporation. The MeAPSO materials of this invention are crystalline microporous compositions and often contain "Si islands," regions of "Si—O—Si" bonding.

SUMMARY OF THE INVENTION

As stated, the present invention relates to a new family of metalloalumino(gallo)phosphosilicate molecular sieves designated high charge density (HCD) MeAPSO. Accordingly, one embodiment of the invention is a crystalline microporous material having a three-dimensional framework of $[MO_{4/2}]^{2-}$, $[EO_{4/2}]^-$, $[PO_{4/2}]^+$ and $SiO_{4/2}$ tetrahedral units and an empirical composition in the as synthesized form and on an anhydrous basis expressed by an empirical formula of:

$$R^{p+}_r A^+_m M^{2+}_w E_x PSi_y O_z$$

where R is at least one of any quaternary ammonium cation, diquaternary ammonium cation triquaternary ammonium cation, quatroquaternary ammonium cation and mixtures thereof, "r" is the mole ratio of R to P and has a value of about 0.04 to about 4.0, "p" is the weighted average valence of R and varies from 1 to 4, A is an alkali metal such as $Li^+$, $Na^+$, $K^+$, $Rb^+$ and $Cs^+$ and mixtures thereof, "m" is the mole ratio of A to P and varies from 0.04 to 4.0, M is a divalent metal selected from the group Zn, Co, Mg, Mn and mixtures thereof, "w" is the mole ratio of M to P and varies from 0.00268 to 1.35, E is a trivalent element selected from the group consisting of aluminum and gallium and mixtures thereof, "x" is the mole ratio of E to P and varies from 0.1 to 4.0, "y" is the mole ratio of Si to P and varies from 0.008 to about 4.5, and "z" is the mole ratio of O to P and has a value determined by the equation:

$$z = (m + p \cdot r + 2 \cdot w + 3 \cdot x + 5 + 4 \cdot y)/2$$

and the crystalline material is characterized by a specific powder x-ray diffraction pattern.

Another embodiment of the invention is a process for preparing the crystalline metalloalumino(gallo)phosphosilicate molecular sieve described above. The process comprises forming a reaction mixture containing reactive sources of R, E, P, M, A and Si, and heating the reaction mixture at a temperature of about 60° C. to about 200° C. for a time sufficient to form the molecular sieve, the reaction mixture having a composition expressed in terms of mole ratios of the oxides of:

$$aR_{2/p}O : bA_2O : cMO : E_2O_3 : dP_2O_5 : eSiO_2 : fH_2O$$

where "a" has a value of about 2.1 to about 120, "b" has a value of about 0.1 to about 8, "c" has a value of about 0.01 to about 8, "d" has a value of about 1.69 to about 30, "e" has a value from 0.01 to about 16 and "f" has a value from 50 to about 5000.

Yet another embodiment of the invention is a hydrocarbon conversion process using the above-described molecular sieve as a catalyst. The process comprises contacting at least one hydrocarbon with the molecular sieve at conversion conditions to generate at least one converted hydrocarbon.

Still another embodiment of the invention is a separation process using the crystalline HCD MeAPSO material. The process may involve separating mixtures of molecular species or removing contaminants by contacting a fluid with the HCD MeAPSO molecular sieve. Separation of molecular species can be based either on the molecular size (kinetic diameter) or on the degree of polarity of the molecular species. Removing contaminants may be by ion exchange with the molecular sieve.

DETAILED DESCRIPTION OF THE INVENTION

Applicants have prepared a family of metalloalumino (gallo)phosphosilicate-based molecular sieves designated HCD MeAPSO. Compared to other MeAPSO materials in the prior art, the HCD MeAPSO family of materials contains much more Si or more $M^{2+}$ or both and exhibits high framework (FW) charge densities that require the use of alkali cations in addition to quaternary ammonium ions to balance the FW charge. Traditional MeAPSOs, such as those disclosed in U.S. Pat. No. 4,973,785 chiefly use organic-based species for FW charge balance, most often amines, while the use of alkali is avoided. The instant crystalline microporous HCD MeAPSO material has an empirical composition in the as-synthesized form and on an anhydrous basis expressed by the empirical formula:

$$R^{p+}_r A^+_m M^{2+}_w E_x PSi_y O_z$$

where A is at least one alkali cation and is selected from the group of alkali metals. Specific examples of the A cations include but are not limited to lithium, sodium, potassium, rubidium, cesium and mixtures thereof. R is at least one of any quaternary ammonium cation, diquaternary ammonium cation, triquaternary ammonium cation, quatroquaternary ammonium cation and mixtures thereof and "r" is the mole ratio of R to P and varies from about 0.04 to about 4.0, while "p" is the weighted average valence of R and varies from about 1 to 4. M and E are tetrahedrally coordinated and in the framework, M is a divalent element selected from the group of Zn, Mg, Co, Mn and mixtures thereof, while E is a trivalent element selected from aluminum and gallium and mixtures thereof. The value of "m" is the mole ratio of A to P and varies from 0.1 to about 4.0, "w" is the mole ratio of M to P and varies from 0.00268 to 1.35, "x" is mole ratio of E to P and varies from 0.1 to about 4.0. The ratio of silicon to P is represented by "y" which varies from about 0.008 to about 4.5. Lastly, "z" is the mole ratio of O to E and is given by the equation:

$$z=(m \cdot p \cdot r+2 \cdot w+3 \cdot x+5+4 \cdot y)/2$$

When only one type of R quaternary ammonium cation is present, then the weighted average valence is just the valence of that cation, e.g., +1 or +2. When more than one R cation is present, the total amount of R is given by the equation:

$$R_r^{p+}=R_{r1}^{(p1)+}+R_{r2}^{(p2)+}+R_{r3}^{(p3)+}+$$

the weighted average valence "p" is given by:

$$p = \frac{r1 \cdot p1 + r2 \cdot p2 + r3 \cdot p3 + \ldots}{r1 + r2 + r3 + \ldots}$$

Figure 1:
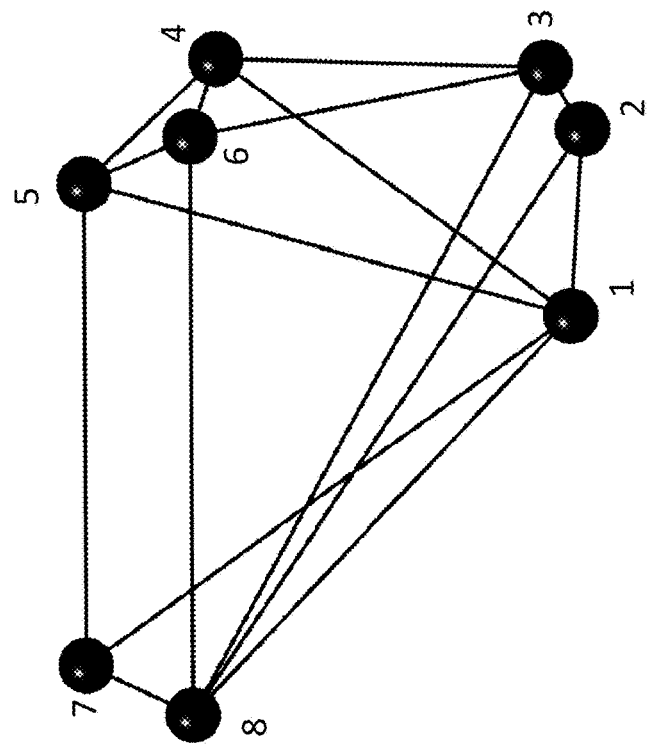
FIG. 1 shows a quaternary phase diagram of the mole fractions of the $M^{2+}$, Al(Ga), Si and P in the molecular sieves of this invention.
Figure 1:
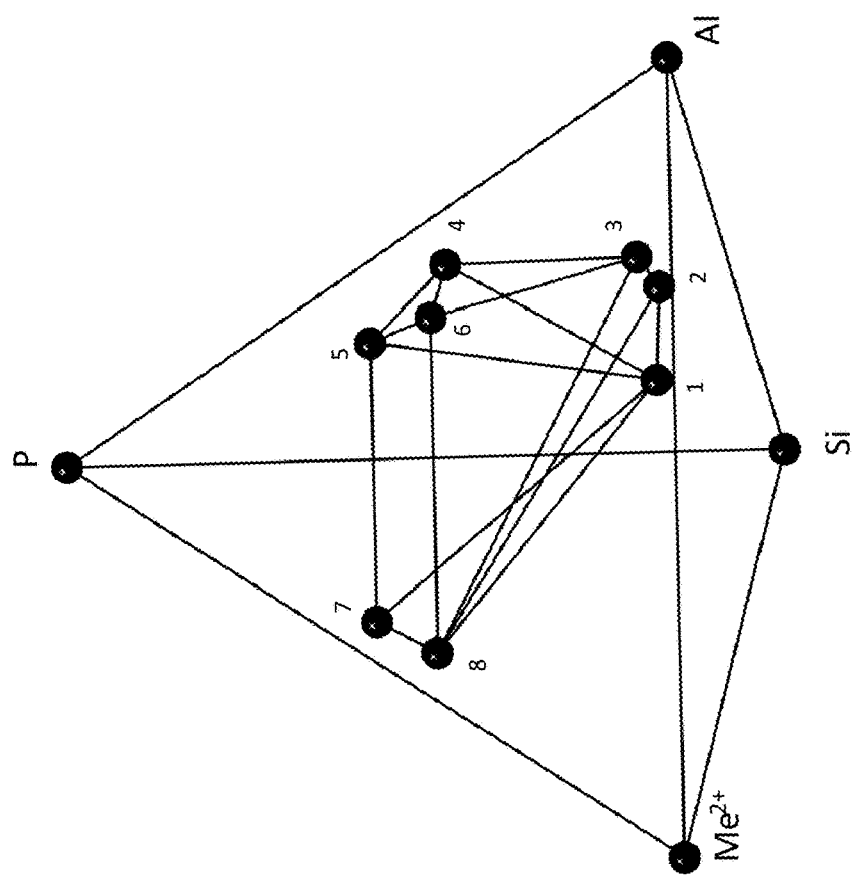

The T-atom compositions comprising this invention, those consisting of $M^{2+}$, Al(Ga), Si and P, are further constrained and are represented in a quaternary phase diagram, as shown in FIG. 1. Expressing the T-atom compositions ($M^{2+}_{w'}$ $Al_{w'}Si_{y'}P_{z'}$) in terms of mole fractions, where w' is the mole fraction of $M^{2+}$, x' is the mole fraction of E (Al, Ga), y' the mole fraction of Si, z' is the mole fraction of P and w'+x'+y'+z'=1, the mole fractions can be plotted in the quaternary phase diagram of FIG. 1. Illustrating by example, the empirical composition of the MeAPSO with M shown as Me in FIG. 1. $DEDMA_{0.30}K_{0.24}Zn_{0.52}Al_{0.54}Si_{0.52}P$ would have mole fraction coordinates w', x', y', and z' given by:

$$w'(M^{2-})=0.52(M^{2-})/(0.52(M^{2+})+0.54(Al)+0.52(Si)+1(P))=0.20$$

$$x'(Al)=0.54(Al)/(0.52(M^{2+})+0.54(Al)+0.52(Si)+1(P))=0.21$$

$$y'(Si)=0.52(Si)/(0.52(M^{2-})+0.54(Al)+0.52(Si)+1(P))=0.20$$

$$z'(P)=1(P)/(0.52(M^{2+})+0.54(Al)+0.52(Si)+1(P))=0.39.$$

Figure 2:
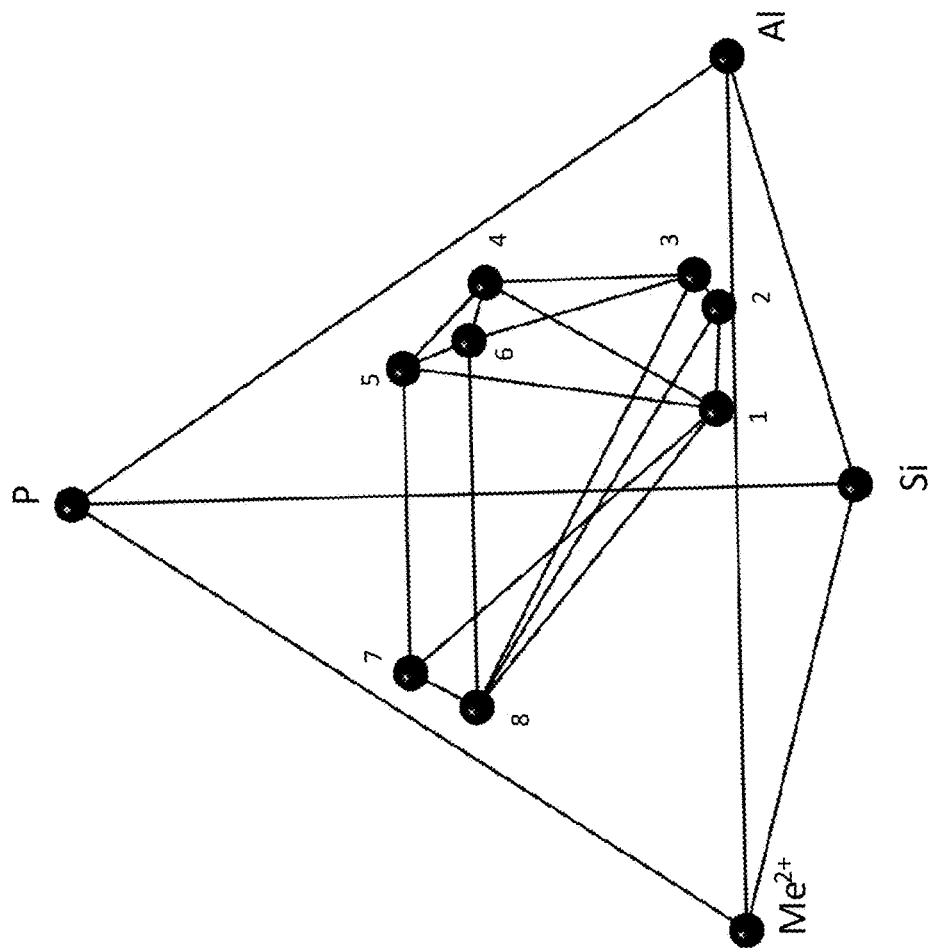
FIG. 2 shows the quaternary phase diagram with the fractional coordinates of the vertices that define the polyhedral MeAPSO composition space.

In the quaternary phase diagram shown in FIG. 1, the mole fraction of each T-atom at its labeled vertex is 1 and at the other 3 vertices of the tetrahedron the value of the mole fraction of that T-atom is 0 and the mole fraction varies continuously from 0 to 1 between the three unlabeled (other) and the labeled vertex. By way of illustration, in FIG. 1, at the vertex labeled Al, the mole fraction of Al is 1, while at the vertices labeled P, $Me^{2+}$ and Si, the mole fraction of Al is 0. In this phase diagram, the coordinates plotted were w'($M^{2+}$), x'(Al) and z'(P), which uniquely describe the quaternary composition since y'(Si)=1−(w'+x'+z'). One can thus consider the Si vertex to be the origin and move along the axes using the given x', w', and z' coordinates to find the indicated composition. Using our example above for $DEDMA_{0.30}K_{0.24}Zn_{0.52}Al_{0.54}Si_{0.52}P$, we plot the mole fraction coordinates (x', w', z')=(0.21, 0.20, 0.39) by moving the appropriate distance along the x'(Al), w'($M^{2+}$) and z'(P) axes. FIG. 1 shows an 8-vertex polyhedron bounded by 10 planes within the quaternary phase diagram space and beside it a close-up of the polyhedron. Within these boundaries are the claimed MeAPSO compositions of the present invention. FIG. 2 shows the quaternary phase diagram with the fractional coordinates of the vertices that define the polyhedral MeAPSO composition space. These are given below in Table A:

TABLE A

Vertex Coordinates of MeAPSO Polyhedron

| Vertex | x' (Al) | w' ($Me^{2+}$) | z' (P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 |

Figure 3:
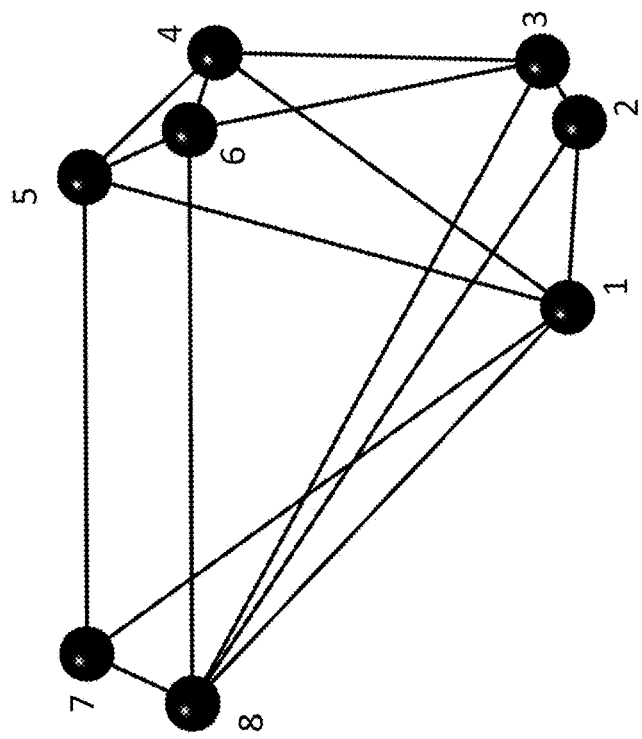
FIG. 3 shows the 8-vertex polyhedron with the 10 planes that serve as boundaries for the MeAPSO compositional space of this invention along with the equations of each of those planes.

FIG. 3 shows the 8-vertex polyhedron with the 10 planes that serve as boundaries for the MeAPSO compositional space of this invention along with the equations of each of those planes. The compositions that are within the boundaries satisfy the following ten inequalities related to the equations of the planes, basically indicating on which side of the plane that the desired compositions reside as shown in Table B:

TABLE B

MeAPSO Compositions - Criteria for x', w' and z'

| Plane Vertices | Plane Equation/Inequalities |
|---|---|
| 1, 2, 3, 4 | w' ≥ 0.001502 |
| 5, 6, 7, 8 | x' + w' + z' ≤ 0.996016 |
| 4, 5, 6 | 1.239 * x' + 0.065 * w' + 1.004 * z' ≤ 1 |
| 1, 4, 5 | x' + 2.274 * w' − 1.25 * z' ≥ 0 |
| 1, 5, 7 | 18.471 * x' + 18.471 * w' − 16.463 * z' ≥ 1 |
| 1, 7, 8 | 4.599 * x' + 0.6046 * w' + 1.004 * z' ≥ 1 |
| 1, 2, 8 | 1.004 * x' − 2.341 * w' + 5.519 * z' ≥ 1 |
| 2, 3, 8 | x' + 2.86 * w' − 4.00 * z' ≤ 0 |
| 3, 4, 6 | 10.009 * x' + 0.9653 * w' + 0.2502 * z' ≤ 5 |
| 3, 6, 8 | 2.212 * x' + 2.212 * w' − 0.808 * z' ≤ 1 |

The HCD MeAPSOs of this invention are crystalline microporous materials with well-defined pore channels. By "microporous" it is meant that the crystalline HCD MeAPSO contains at least one pore system with at least an 8-member ring opening, where an 8-member ring refers to a pore in which 8 T-atoms line the pore circumference; this nomenclature is well-known in the art. That is, the metalloalumino(gallo)phosphosilicates of this invention will exhibit at least one pore with, for example, 8-ring, 10-ring, 12-ring or an even higher number of T-atoms lining the circumference of the pore walls. On the other hand, materials that contain 6-rings are not considered to be porous and are not part of this invention, for example, materials of the SOD topology. When the topology of the HCD MeAPSO is known, as identified by powder x-ray diffraction, the determination of microporosity can be made by consulting the Database of Zeolite structures at (http://izasc.biw.kuleuven.be/fmi/xsl/IZA-SC/ft.xsl). However, when the topology of the HCD MeAPSOs of this invention is not known, the determination of microporosity can be made by demonstrating ion-exchange of either the as-synthesized or calcined metalloalumino(gallo)phosphosilicate without significant structural change or by the adsorption of at least a small molecule, such as water, carbon dioxide or n-butane. These practices are well known in the art.

The HCD MeAPSO of this invention is characterized by a high charge density compared to that known for most MeAPSO materials and can exhibit significant formation of "Si islands," i.e., Si—O—Si bonding. The FW charge on ideal HCD MeAPSOs in terms of the empirical formula given above is $-2\cdot\text{"w"}-\text{"x"}+1$ or $-2\cdot M-Al+P$. The charge on these materials is such that highly charged alkali cations are employed in addition to quaternary ammonium cations to balance the FW charge. Comparing MeAPSO materials to AlPO materials, two substitution mechanisms leading to FW charge are at work compared to the parent neutral AlPO materials, namely $[M^{2+}O_{4/2}]^{2-}$ for $[AlO_{4/2}]^{-}$ and $[SiO_{4/2}]$ for $[PO_{4/2}]^{+}$. "Si" incorporation is observed in two different ways in the HCD MeAPSO materials. In one case, Si only substitutes for P, adding FW charge in the process as mentioned above. All FW phosphorous must be isolated because it can only be bonded to M or E in the framework via P—O-E(M) bonding, and therefore, the Si substituting for P is also isolated. However, unlike P, Si can also bond to itself through Si—O—Si bonding, forming what are known as "Si islands." "Si islands" are known in the art even for lower charge density materials, for example, for SAPO-56 (See Microporous and Mesoporous Materials, 28, (1999), 125-137). In the present case of ideal HCD MeAPSOs, the presence of "Si islands" is apparent when, in terms of the empirical formula describing the HCD MeAPSO, "w"+"x"<1+"y".

It has also been noted that in the HCD MeAPSO materials that a portion of $M^{2+}$ may also reside in the pores, likely in a charge balancing role.

The crystalline microporous metalloalumino(gallo)phosphosilicate, a HCD MeAPSO, is prepared by a hydrothermal crystallization of a reaction mixture prepared by combining reactive sources of R, A, E, phosphorous, M and silicon. A preferred form of the HCD MeAPSO materials is when E is Al. The sources of aluminum include but are not limited to aluminum alkoxides, precipitated aluminas, aluminum metal, aluminum hydroxide, aluminum salts, alkali aluminates and alumina sols. Specific examples of aluminum alkoxides include, but are not limited to aluminum ortho sec-butoxide and aluminum ortho isopropoxide. Sources of M include but are not limited to zinc acetate, zinc chloride, cobalt acetate, cobalt chloride, magnesium acetate, magnesium nitrate, manganese sulfate, manganese acetate and manganese nitrate. Sources of phosphorus include, but are not limited to, orthophosphoric acid, phosphorus pentoxide and ammonium dihydrogen phosphate. Sources of silica include but are not limited to tetraethylorthosilicate, colloidal silica, alkali silicates and precipitated silica. Sources of the other E elements include but are not limited to precipitated gallium hydroxide, gallium chloride, gallium sulfate or gallium nitrate. Sources of the A metals include the halide salts, nitrate salts, hydroxide salts, acetate salts, and sulfate salts of the respective alkali metals. R is at least one of any organoammonium cation selected from the groups consisting of quaternary ammonium, diquaternary ammonium, triquaternary ammonium, quatroquaternary ammonium cations and mixtures thereof, a few examples of which, but not limited to, are ethyltrimethylammonium (ETMA$^+$), choline, diethydimethylammonium (DEDMA$^+$), trimethylpropylammonium, tetramethylammonium (TMA$^+$), tetraethylammonium (TEA$^+$), tetrapropylammonium (TPA$^-$), hexamethonium (HM$^{2+}$), N,N,N',N'-tetramethyl-N,N'-p-xyleno-1,6-hexanediammonium, N,N,N',N'-tetramethyl-N,N'-butano-1,6-hexanediammonium, tris-1,3,5-(dimethylethylammoniomethyl)benzene, [(C$_6$H$_5$CH$_2$)(Me$_2$)N(—CH$_2$CH(OH)CH$_2$N(Me$_2$)-)$_3$CH$_2$C$_6$H$_5$]$^{4+}$ and mixtures thereof, and the sources include the hydroxide, chloride, bromide, iodide, acetate and fluoride compounds. Specific examples include without limitation ethyltrimethylammonium hydroxide, ethyltrimethylammonium chloride, diethyldimethylammonium chloride, diethyldimethylammonium hydroxide, propyltrimethylammonium chloride, tetramethylammonium chloride, tetraethylammonium hydroxide, tetrapropylammonium hydroxide, hexamethonium dihydroxide, hexamethonium dichloride, N,N,N',N'-tetramethyl-N,N'-p-xyleno-1,6-hexanediammonium dibromide, N,N,N',N'-tetramethyl-N,N'-butano-1,6-hexanediammonium dihydr- oxide, tris-1,3,5-(dimethylethylammoniomethyl)benzene tribromide and [(C$_6$H$_5$CH$_2$)(Me$_2$)N(—CH$_2$CH(OH)CH$_2$N(Me$_2$)-)$_3$CH$_2$C$_6$H$_5$]$^{4+}$ tetrachloride.

The reaction mixture containing reactive sources of the desired components can be described in terms of molar ratios of the oxides by the formula:

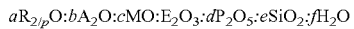

$$aR_{2/p}O:bA_2O:cMO:E_2O_3:dP_2O_5:eSiO_2:fH_2O$$

where "a" varies from about 2.1 to about 120, "b" varies from about 0.1 to about 8, "c" varies from about 0.01 to about 8, "d" varies from about 1.69 to about 30, "e" varies from 0.01 to 16 and "f" varies from 50 to 5000. If alkoxides are used, it is preferred to include a distillation or evaporative step to remove the alcohol hydrolysis products. The reaction mixture is now reacted at a temperature of about 60° C. to about 200° C. and preferably from about 95° C. to about 175° C. for a period of about 1 day to about 3 weeks and preferably for a time of about 1 day to about 14 days in a sealed reaction vessel at autogenous pressure. After crystallization is complete, the solid product is isolated from the heterogeneous mixture by means such as filtration or centrifugation, and then washed with deionized water and dried in air at ambient temperature up to about 100° C. HCD MeAPSO seeds can optionally be added to the reaction mixture in order to accelerate or otherwise enhance the formation of the desired microporous composition.

A favored approach for the synthesis of HCD MeAPSOs is the Charge Density Mismatch Approach, which has been applied to the synthesis of aluminosilicate zeolites (See U.S. Pat. No. 7,578,993 and CHEM. MATER., 2014, 26, 6684-6694). Metalloalumino(gallo)phosphosilicate solutions are prepared with excess phosphate and large, low charge density SDAs, such as TPAOH, TEAOH, and TBAOH, which are then perturbed by the addition of small amounts of alkali and more highly charged organoammonium cations, including quaternaryammonium, diquaternaryammonium, cyclic diquaternaryammonium, triquaternaryammonium and quatroquaternary ammonium cations to induce crystallization under the synthesis conditions. This leads to rich chemistry in which there is often cooperation between multiple SDAs to form a single molecular sieve structure. The method has advantages in expense and efficiency because non-commercially available organoammonium cations can be utilized in small amounts as halide salts; they don't have to be converted to the hydroxide form for use, an additional and expensive step.

The various crystalline microporous HCD metalloalumino(gallo)phosphosilicate species, which are obtained from the above-described process, are characterized by specific x-ray diffraction patterns, as illustrated in the examples.

The HCD MeAPSO may be modified in many ways to tailor it for use in a particular application. Modifications include calcination, ammonia calcinations, ion-exchange, steaming, various acid extractions, ammonium hexafluorosilicate treatment, or any combination thereof, as outlined for the case of UZM-4 in U.S. Pat. No. 6,776,975 which is incorporated by reference in its entirety. In addition, properties that may be modified include porosity, adsorption, framework composition, acidity, thermal stability, ion-exchange capacity, etc.

As synthesized, the HCD MeAPSO material will contain some of the exchangeable or charge balancing cations in its pores. These exchangeable cations can be exchanged for other cations, or in the case of organic cations, they can be removed by heating under controlled conditions. Sometimes, organic cations may be removed directly by ion-exchange, heating may not be necessary. If heating is necessary to remove organic cations, a preferred method of their removal from the pores is ammonia calcination. Calcination in air converts the organic cations in the pores to protons, which can lead to the loss of some metal, for example Al, from the framework upon exposure to ambient atmospheric water vapor. When the calcination is carried out in an ammonia atmosphere, the organic cation in the pore is replaced by $NH_4^+$ cation and the framework remains intact (See STUDIES IN SURFACE SCIENCE, (2004) vol. 154, p. 1324-1331). Typical conditions for ammonia calcinations include the use of gaseous anhydrous ammonia flowing at a rate of 1.1 l/min while ramping the sample temperature at 5° C./min to 500° C. and holding at that temperature for a time ranging from 5 minutes to an hour. The resulting ammonium/alkali form of the HCD MeAPSO has essentially the diffraction pattern of as-synthesized MeAPSO. Once in this form, the ammonia calcined material may be ion-exchanged with $H^+$, $NH_4^+$, alkali metals, alkaline earth metals, transition metals, rare earth metals, or any mixture thereof, to achieve a wide variety of compositions with the HCD MeAPSO framework in superior condition.

When the HCD MeAPSO or its modified forms are calcined in air, there can be a loss of metal from the framework, such as Al, which can alter the x-ray diffraction pattern from that observed for the as-synthesized HCD MeAPSO (See STUDIES IN SURFACE SCIENCE, (2004) vol. 154, p. 1324-1331). Typical conditions for the calcination of the HCD MeAPSO sample include ramping the temperature from room temperature to a calcination temperature of 400° to 600° C., preferably a calcination temperature of 450° to 550° C. at a ramp rate of 1 to 5° C./min, preferably a ramp rate of 2 to 4° C./min, the temperature ramp conducted in an atmosphere consisting either of flowing nitrogen or flowing clean dry air, preferably an atmosphere of flowing nitrogen. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; preferably at the calcination temperature the calcination atmosphere will remain flowing nitrogen for a period of 1-10 hours and preferably for a period of 2-4 hours before converting the calcination atmosphere to flowing clean dry air. The final step of the calcination is a dwell at the calcination temperature in clean dry air. Whether the calcination atmosphere during the initial temperature ramp was flowing nitrogen or flowing clean dry air, once at the calcination temperature and once the calcination atmosphere is clean dry air, the HCD MeAPSO sample will spend a period of 1-24 hours and preferably a period of 2-6 hours under these conditions to complete the calcination process.

The crystalline HCD MeAPSO materials of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The HCD MeAPSO compositions of this invention can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204-649° C.), preferably between 600° and 950° F. (316-510° C.). Reaction pressures are in the range of atmospheric to about 3,500 psig (24,132 kPa g), preferably between 200 and 3000 psig (1379-20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the HCD MeAPSO composition using feedstocks such as gas oils, heavy naphthas, deasphalted crude oil residua, etc. with gasoline being the principal desired product. Temperature conditions of 850° to 1100° F. (455° C. to 593° C.), LHSV values of 0.5 $hr^{-1}$ to 10 $hr^{-1}$ and pressure conditions of from about 0 to 50 psig (0-345 kPa) are suitable.

Alkylation of aromatics usually involves reacting an aromatic ($C_2$ to $C_{12}$), especially benzene, with a monoolefin to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig (1,379-6,895 kPa). Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 $hr^{-1}$ to about 120 $hr^{-1}$. Details on paraffin alkylation may be found in U.S. Pat. Nos. 5,157,196 and 5,157,197, which are incorporated by reference.

The conversion of methanol to olefins is effected by contacting the methanol with the HCD MeAPSO catalyst at conversion conditions, thereby forming the desired olefins. The methanol can be in the liquid or vapor phase with the vapor phase being preferred. Contacting the methanol with the HCD MeAPSO catalyst can be done in a continuous mode or a batch mode with a continuous mode being preferred. The amount of time that the methanol is in contact with the HCD MeAPSO catalyst must be sufficient to convert the methanol to the desired light olefin products. When the process is carried out in a batch process, the contact time varies from about 0.001 hour to about 1 hour and preferably from about 0.01 hour to about 1.0 hour. The longer contact times are used at lower temperatures while shorter times are used at higher temperatures. Further, when the process is carried out in a continuous mode, the Weight Hourly Space Velocity (WHSV) based on methanol can vary from about 1 $hr^{-1}$ to about 1000 $hr^{-1}$ and preferably from about 1 $hr^{-1}$ to about 100 $hr^{-1}$.

Generally, the process must be carried out at elevated temperatures in order to form light olefins at a fast enough rate. Thus, the process should be carried out at a temperature of about 300° C. to about 600° C., preferably from about 400° C. to about 550° C. and most preferably from about 450° C. to about 525° C. The process may be carried out over a wide range of pressure including autogenous pressure. Thus, the pressure can vary from about 0 kPa (0 psig) to about 1724 kPa (250 psig) and preferably from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e.g., methane, aromatic hydrocarbons, e.g., benzene, toluene and mixtures thereof. The amount of diluent used can vary considerably and is usually from about 5 to about 90 mole percent of the feedstock and preferably from about 25 to about 75 mole percent.

The actual configuration of the reaction zone may be any well known catalyst reaction apparatus known in the art. Thus, a single reaction zone or a number of zones arranged in series or parallel may be used. In such reaction zones the methanol feedstock is flowed through a bed containing the HCD MeAPSO catalyst. When multiple reaction zones are used, one or more HCD MeAPSO catalysts may be used in series to produce the desired product mixture. Instead of a fixed bed, a dynamic bed system, e.g., fluidized or moving, may be used. Such a dynamic system would facilitate any regeneration of the HCD MeAPSO catalyst that may be required. If regeneration is required, the HCD MeAPSO catalyst can be continuously introduced as a moving bed to a regeneration zone where it can be regenerated by means such as oxidation in an oxygen containing atmosphere to remove carbonaceous materials.

The following examples are presented in illustration of this invention and are not intended as undue limitations on the generally broad scope of the invention as set out in the appended claims. The HCD MeAPSO products will be designated with a name like MeAPSO-82 where the MeAPSO prefix indicates the material contains $Me^{2+}$, E, Si, and P framework T-atoms while the suffix "-82" indicates the "-82" structure (which happens to have the CGS topology). In each case, the topology associated with the suffix "structure number" will be identified if known.

The structure of the HCD MeAPSO compositions of this invention was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as:

$$w=0-15; m=15-60: s=60-80 \text{ and } vs=80-100$$

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

Example 1

A Teflon bottle was charged with 116.00 g DEDMAOH (20%, SACHEM, Inc.) followed by the addition of 5.17 g tetraethylorthosilicate (TEOS, 98%, Sigma-Aldrich). A stir bar was added and the bottle was sealed. The reaction mixture was stirred for 18 hours to hydrolyze TEOS and then transferred to a Teflon beaker and placed under a high speed stirrer. Pre-ground aluminum isopropoxide (13.2% Al), 4.97 g, was added to the reaction mixture and dissolved with stirring, followed by the addition of 25.00 g de-ionized water. Then 16.69 g $H_3PO_4$ (85.7%) was added dropwise to the stirring reaction mixture. Separately, 5.34 g Zn(O Ac)$_2$*2H$_2$O was dissolved in 25.00 g de-ionized water and this solution was added dropwise over the course of three stages. Another solution was prepared by dissolving 1.19 g KOAc (99.4%) in 10.64 g de-ionized water, which was added to the reaction mixture intermittently in a dropwise fashion. The reaction mixture was homogenized further before it was distributed among 7 Teflon-lined autoclaves, which were quiescently digested at autogenous pressure at temperatures of 95, 125, 150, and 175° C., for either 48 or 168 hours or both. The solid products were isolated by centrifugation, washed with de-ionized water and dried at room temperature. The products isolated from all of the digestions were identified as containing MeAPSO-82 with the CGS topology as the major product by powder x-ray diffraction. However, the products isolated from the 95° C./168 hours and 175° C./48 hours digestions yielded MeAPSO-82 free of other diffraction lines. The representative diffraction lines for the product from the 175° C./48 hours digestion are shown in Table 1 below. Elemental analysis showed this product was composed of the elemental ratios Al/P=0.54, Zn/P=0.52, K/P=0.24, Si/P=0.52 and N/P=0.30, consistent with the stoichiometry DED $MA_{0.30}K_{0.24}Zn_{0.52}Al_{0.54}Si_{0.52}P$.

TABLE 1

| 2-Θ | d (Å) | I/I$_0$ (%) |
|---|---|---|
| 8.13 | 10.86 | vs |
| 10.70 | 8.26 | w |
| 11.54 | 7.66 | w |
| 12.25 | 7.22 | m |
| 12.96 | 6.82 | w |
| 13.18 | 6.71 | w |
| 16.30 | 5.44 | m |
| 16.69 | 5.31 | w |
| 17.03 | 5.20 | w |
| 19.10 | 4.64 | m |
| 19.42 | 4.57 | w |
| 21.22 | 4.18 | w |
| 21.58 | 4.12 | w |
| 21.98 | 4.04 | w |
| 22.57 | 3.94 | w |
| 22.88 | 3.88 | w |
| 23.21 | 3.83 | w |
| 23.54 | 3.78 | w |
| 23.90 | 3.72 | w |
| 24.14 | 3.68 | w |
| 24.68 | 3.60 | m, br |
| 26.14 | 3.41 | m |
| 26.48 | 3.36 | w |
| 26.92 | 3.31 | m |
| 28.04 | 3.18 | w |
| 28.66 | 3.11 | m |
| 29.06 | 3.07 | m |
| 30.14 | 2.96 | w |
| 30.46 | 2.93 | w |
| 31.12 | 2.87 | w |
| 31.50 | 2.84 | m |
| 32.90 | 2.72 | w |
| 33.34 | 2.69 | w |
| 34.14 | 2.62 | m |
| 35.00 | 2.56 | m |

Example 2

A Teflon bottle was charged with 102.35 g ETMAOH (20%, SACHEM, Inc.). Additionally, 5.17 g TEOS (98%) and a stir bar were added. The bottle was sealed and the solution was stirred to hydrolyze the TEOS. The solution was then transferred to a Teflon beaker and placed under a high speed stirrer. Pre-ground aluminum isopropoxide (13.2% Al), 4.97 g, was added and dissolved with stirring. Next, 16.69 g H$_3$PO$_4$ (85.7%) was added to the reaction mixture in a dropwise fashion. This was followed by the addition of 37.00 g de-ionized water to the reaction mixture. Separately, 5.34 g Zn(OAc)$_2$*2H$_2$O was dissolved in 25.00 g de-ionized water and the resulting solution was added dropwise to the reaction mixture. Additionally, 1.19 g KOAc (99.4%) was dissolved in 9.50 g de-ionized water and added to the reaction mixture in a dropwise fashion. The reaction mixture was homogenized further before it was distributed among 7 Teflon-lined autoclaves, which were quiescently digested at autogenous pressure at temperatures of 95, 125, 150, and 175° C., for either 88 or 188 hours or both. The solid products were isolated by centrifugation, washed with de-ionized water and dried at room temperature. The products isolated from all of the digestions were identified as containing MeAPSO-82 with the CGS topology as the major product by powder x-ray diffraction. However, the product isolated from the 95° C./188 hours digestion yielded MeAPSO-82 that was nearly pure. The representative diffraction lines for the product from the 95° C./188 hours digestion are shown in Table 2 below. Elemental analysis showed this product was composed of the elemental ratios Al/P=0.56, Zn/P=0.52, K/P=0.25, Si/P=0.56 and N/P=0.32, consistent with the stoichiometry ET $MA_{0.32}K_{0.25}Zn_{0.52}Al_{0.56}Si_{0.56}P$.

TABLE 2

| 2-Θ | d (Å) | I/I$_0$ (%) |
|---|---|---|
| 6.28 | 14.06 | m*, br |
| 8.24 | 10.73 | vs |
| 10.80 | 8.19 | w |
| 11.60 | 7.62 | m |
| 12.44 | 7.11 | m |
| 13.08 | 6.77 | w |
| 13.26 | 6.67 | w |
| 16.48 | 5.38 | s |
| 16.85 | 5.26 | w |
| 17.20 | 5.15 | w |
| 19.20 | 4.62 | s |
| 19.45 | 4.56 | m |
| 19.58 | 4.53 | m |
| 20.61 | 4.31 | w |
| 21.63 | 4.11 | m |
| 21.84 | 4.07 | m |
| 22.24 | 3.99 | m |
| 22.82 | 3.89 | w |
| 23.05 | 3.86 | m |
| 23.30 | 3.81 | w |
| 23.78 | 3.74 | m |
| 24.14 | 3.68 | m |
| 24.86 | 3.58 | m, br |
| 26.3 | 3.39 | m |
| 26.76 | 3.33 | m |
| 27.28 | 3.27 | m |
| 29.00 | 3.08 | m |
| 29.40 | 3.04 | m |
| 30.44 | 2.93 | m |
| 30.78 | 2.90 | w |
| 31.56 | 2.83 | m |
| 31.88 | 2.81 | m |
| 33.26 | 2.69 | w |
| 33.80 | 2.65 | w |
| 34.30 | 2.61 | m |
| 35.08 | 2.56 | m |

*impurity

Example 3

A Teflon beaker was charged with 150.00 g ETMAOH (SACHEM Inc., 20%), to which 6.06 g TEOS (98%) was added and the mixture was stirred for 2 hours with a high speed mixer. The solution was transferred to a sealed Teflon bottle and digested for 2 hours at 95° C. to hydrolyze the TEOS. The reaction mixture was transferred back to a Teflon beaker and 5.79 g of pre-ground aluminum isopropoxide (Sigma-Aldrich, 13.3% Al) was added and dissolved with vigorous stirring. This was followed by the fast dropwise addition of 19.57 g H$_3$PO$_4$ (85.7%). Separately, 6.26 g Zn(OAc)$_2$*2H$_2$O was dissolved in 30.30 g de-ionized water. This solution was added to the reaction mixture in a dropwise fashion in four separate aliquots, stirring between each addition. A solution was prepared by dissolving 2.82 g KOAc (99.4%) in 30.30 g de-ionized water. This solution was added dropwise to the reaction mixture in three aliquots and the reaction mixture was homogenized. The reaction mixture was distributed among 7 Teflon-lined autoclaves and digested quiescently at autogenous pressure at temperatures of 95, 125, 150, and 175° C., for either 33 or 149 hours or both. The solid products were isolated by centrifugation, washed with de-ionized water and dried at room temperature. All of the products were found to contain MeAPSO-83 with the BPH topology by powder x-ray diffraction, except three of the products contained a slight impurity. The representative diffraction lines are shown in Table 3 below for the pure MeAPSO-83 product from the 125° C./149 hours digestion. Scanning Electron Microscopy (SEM) showed this product to consist of hexagonal plate crystals ranging from 0.2 to 0.8μ across and about 0.015 to 0.15μ thick. Elemental analysis of this same product showed it was composed of the elemental ratios Al/P=0.43, Zn/P=0.64, Si/P=0.096, K/P=0.39, and N/P=0.18, consistent with the stoichiometry $ETMA_{0.18}K_{0.39}Zn_{0.64}Al_{0.43}PSi_{0.10}$.

TABLE 3

| 2-Θ | d (Å) | $I/I_0$ (%) |
|---|---|---|
| 6.68 | 13.22 | vs |
| 7.56 | 11.69 | vs |
| 13.10 | 6.75 | m |
| 13.39 | 6.61 | m |
| 14.72 | 6.01 | w |
| 15.38 | 5.76 | m |
| 18.76 | 4.73 | m |
| 20.10 | 4.41 | m |
| 21.18 | 4.19 | m |
| 23.77 | 3.74 | w |
| 24.10 | 3.69 | s |
| 26.52 | 3.36 | m |
| 27.24 | 3.27 | m |
| 27.48 | 3.24 | w |
| 28.32 | 3.15 | m |
| 28.58 | 3.12 | m |
| 29.70 | 3.01 | m |
| 30.06 | 2.97 | m |
| 30.56 | 2.92 | m |
| 31.04 | 2.88 | w |
| 31.30 | 2.86 | w |
| 33.38 | 2.68 | m |
| 33.84 | 2.65 | m |
| 35.14 | 2.55 | w |
| 35.82 | 2.51 | w |
| 36.11 | 2.49 | w |
| 36.46 | 2.46 | w |
| 38.08 | 2.36 | w |
| 38.88 | 2.31 | w |
| 39.68 | 2.27 | w |
| 40.84 | 2.21 | w |
| 43.06 | 2.10 | w |
| 43.46 | 2.08 | w |
| 43.82 | 2.06 | w |
| 45.94 | 1.97 | w |
| 49.60 | 1.84 | w |

Example 4

A Teflon bottle was charged with 145.00 g DEDMAOH (SACHEM Inc., 20%). A stir bar and 5.17 g TEOS (98%) were added, the bottle sealed and stirred at room temperature for 18 hours to hydrolyze the TEOS. The reaction mixture was then transferred to a Teflon beaker and placed under a high speed stirrer. Pre-ground aluminum isopropoxide (13.2% Al), 4.97 g, was then added and dissolved with stirring. This was followed by the dropwise addition of 16.69 g $H_3PO_4$ (85.7%). Separately, $Zn(OAc)_2 \cdot 2 H_2O$, 5.34 g, was dissolved in 25.00 g de-ionized water. This solution was added dropwise to the reaction mixture. Another solution was prepared by dissolving 1.19 g KOAc (99.4%) in 12.44 g de-ionized water. This solution was added dropwise in two steps with a stirring period in between. The final reaction mixture was homogenized for an additional hour. The reaction mixture was distributed among 7 Teflon-lined autoclaves and digested at autogenous pressures at temperatures of 95°, 125°, 150°, and 175° C., for either 48 or 167 hours or both. The solid products were isolated by centrifugation and washed with de-ionized water. With the exception of the product of the 95° C./177 hours digestion, all of the products were found to contain MeAPSO-83 with the BPH topology as the major product by powder x-ray diffraction, with the 48 hours samples containing a minor impurity. The representative diffraction lines are shown in Table 4 below for the pure MeAPSO-83 product from the 150° C./167 hours digestion. Scanning Electron Microscopy (SEM) showed this product to consist of hexagonal plate crystals ranging from 0.5 to 3μ across and about 0.1 to 1.0μ thick. Elemental analysis of the same product showed it is composed of the following elemental ratios: Al/P=0.50, Zn/P=0.64, Si/P=0.61, K/P=0.32, and N/P=0.38, consistent with the stoichiometry $DEDMA_{0.38}K_{0.32}Zn_{0.64}Al_{0.50}PSi_{0.61}$.

TABLE 4

| 2-Θ | d (Å) | $I/I_0$ (%) |
|---|---|---|
| 6.70 | 13.18 | s |
| 7.56 | 11.68 | vs |
| 10.09 | 8.76 | w |
| 13.10 | 6.75 | w |
| 13.38 | 6.61 | w |
| 14.72 | 6.01 | w |
| 15.38 | 5.76 | m |
| 16.55 | 5.35 | w |
| 18.76 | 4.73 | m |
| 20.12 | 4.41 | m |
| 21.16 | 4.20 | m |
| 23.72 | 3.75 | w |
| 24.08 | 3.69 | m |
| 26.46 | 3.37 | m |
| 27.20 | 3.28 | m |
| 27.42 | 3.25 | w |
| 28.26 | 3.16 | m |
| 28.54 | 3.13 | m |
| 29.64 | 3.01 | m |
| 30.02 | 2.97 | m |
| 30.52 | 2.93 | m |
| 31.00 | 2.88 | w |
| 31.25 | 2.86 | w |
| 33.30 | 2.69 | m |
| 33.78 | 2.65 | m |
| 35.06 | 2.56 | w |
| 35.73 | 2.51 | w |
| 36.37 | 2.47 | w |
| 38.00 | 2.37 | w |
| 39.62 | 2.27 | w |
| 39.94 | 2.26 | w |
| 40.76 | 2.21 | w |
| 42.92 | 2.11 | w |
| 43.36 | 2.09 | w |
| 43.78 | 2.07 | w |
| 49.46 | 1.84 | m |

Example 5

A Teflon bottle was charged with 174.00 g DEDMAOH (20%), followed by the addition of 5.17 g TEOS (98%) and a stirbar. The bottle was sealed and the solution was stirred for 18 hours to hydrolyze the TEOS. The reaction mixture was transferred to a Teflon beaker and placed under a high speed stirrer. Pre-ground aluminum isopropoxide (13.2% Al), 4.97 g, was added and dissolved with vigorous stirring. This was followed by the dropwise addition of 16.69 g $H_3PO_4$ (85.7%). Separately, 5.34 g $Zn(OAc)_2 \cdot 2H_2O$ was dissolved in 25.00 g de-ionized water and the resulting solution was added to the reaction mixture in a dropwise fashion. While the reaction mixture continued to stir, 1.19 g KOAc (99.4%) was dissolved in 7.88 g de-ionized water. This solution was added dropwise and post-addition the reaction mixture was homogenized further. The reaction mixture was distributed among 7 Teflon-lined autoclaves and digested at autogenous pressure at temperatures of 95°, 125°, 150°, and 175° C., for either 48 or 168 hours or both. The solid products were isolated by centrifugation and washed with de-ionized water. The product of the 95° C./168 hour digestion was identified as MeAPSO-83 with the BPH topology by powder x-ray diffraction. The representative diffraction lines are shown in Table 5 below for this product. Scanning Electron Microscopy (SEM) showed crystals of this MeAPSO-83 product to consist of hexagonal plates 0.1 to 3μ in diameter and from 0.015 to 0.8μ thick. Elemental analysis of the same product showed it is composed of the following elemental ratios: Al/P=0.41, Zn/P=0.85, Si/P=0.10, K/P=0.34, and N/P=0.22, consistent with the stoichiometry $DEDMA_{0.22}K_{0.34}Zn_{0.85}Al_{0.41}PSi_{0.10}$.

TABLE 5

| 2-Θ | d (Å) | I/I₀ (%) |
|---|---|---|
| 6.72 | 13.14 | vs |
| 7.58 | 11.66 | m |
| 10.10 | 8.75 | w |
| 13.12 | 6.74 | w |
| 13.41 | 6.60 | w |
| 14.74 | 6.01 | w |
| 15.40 | 5.75 | m |
| 16.55 | 5.35 | w |
| 18.76 | 4.73 | m |
| 20.12 | 4.41 | m |
| 21.16 | 4.20 | m |
| 23.76 | 3.74 | w |
| 24.08 | 3.69 | m |
| 26.50 | 3.36 | m |
| 27.21 | 3.28 | w |
| 27.44 | 3.25 | w |
| 28.30 | 3.15 | w |
| 28.56 | 3.12 | m |
| 29.66 | 3.01 | m |
| 30.06 | 2.97 | m |
| 30.52 | 2.93 | m |
| 30.99 | 2.88 | w |
| 33.34 | 2.69 | w |
| 33.82 | 2.65 | m |
| 35.12 | 2.55 | w |
| 35.74 | 2.51 | w |
| 36.07 | 2.49 | w |
| 36.42 | 2.46 | w |
| 38.00 | 2.37 | w |
| 39.62 | 2.27 | w |
| 39.98 | 2.25 | w |
| 40.78 | 2.21 | w |
| 42.96 | 2.10 | w |
| 43.36 | 2.09 | w |
| 44.04 | 2.05 | w |
| 49.48 | 1.84 | w |

Specific Embodiments

While the following is described in conjunction with specific embodiments, it will be understood that this description is intended to illustrate and not limit the scope of the preceding description and the appended claims.

A first embodiment of the invention is a microporous crystalline metalloalumino(gallo)phosphosilicate material having a three-dimensional framework of $[M^{2+}O_{4/2}]^{2-}$, $[EO_{4/2}]^-$, $[PO_{4/2}]^-$ and $SiO_{4/2}$ tetrahedral units and an empirical composition in the as synthesized form and on an anhydrous basis expressed by an empirical formula of $R^{p+}_r A^+_m M^{2+}_w E_x PSi_y O_z$ where R is at least one of any quaternary ammonium cation, diquaternary ammonium cation triquaternary ammonium cation, quatroquaternary ammonium cation and mixtures thereof, "r" is the mole ratio of R to P and has a value of about 0.04 to about 4.0, "p" is the weighted average valence of R and varies from 1 to 4, A is an alkali metal selected from the group consisting of $Li^+$, $Na^+$, $K^+$, $Rb^+$ and $Cs^+$ and mixtures thereof, "m" is the mole ratio of A to P and varies from 0.04 to 4.0, M is a divalent metal selected from the group consisting of Zn, Co, Mg, Mn and mixtures thereof, "w" is the mole ratio of M to P and varies from 0.00268 to 1.35, E is a trivalent element selected from the group consisting of aluminum and gallium and mixtures thereof, "x" is the mole ratio of E to P and varies from 0.1 to 4.0, "y" is the mole ratio of Si to P and varies from 0.008 to about 4.5, and "z" is the mole ratio of O to P and has a value determined by the equation z=(m+p·r+2·w+3·x+5+4·y)/2 where the T-atom compositions for M("w"), E("x"), Si("y") and P(1) are further constrained when expressed as the mole fraction composition $M^{2+}_{w'}Al_{x'}Si_{y'}P_{z'}$, where w'=w/(w+x+y+1), x'=x/(w+x+y+1), y'=y/(w+x+y+1), z'=1/(w+x+y+1) and w'+x'+y'+z'=1, such that the plot of the allowed values of w', x', y' and z' in a quaternary phase diagram conforms to a composition bound by the 8-vertex, 10-sided polyhedron shown in FIG. 1 consisting of the eight vertices whose coordinates are given in Table A:

TABLE A

Vertex Coordinates of MeAPSO Polyhedron

| Vertex | x' (Al) | w' ($Me^{2+}$) | z' (P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 | and defined by the plane equation/inequalities given in Table B:

TABLE B

MeAPSO Compositions - Criteria for x', w' and z'

| Plane Vertices | Plane Equation/Inequalities |
|---|---|
| 1, 2, 3, 4 | w' ≥ 0.001502 |
| 5, 6, 7, 8 | x' + w' + z' ≤ 0.996016 |
| 4, 5, 6 | 1.239 * x' + 0.065 * w' + 1.004 * z' ≤ 1 |
| 1, 4, 5 | x' + 2.274 * w' − 1.25 * z' ≥ 0 |
| 1, 5, 7 | 18.471 * x' + 18.471 * w' − 16.463 * z' ≥ 1 |
| 1, 7, 8 | 4.599 * x' + 0.6046 * w' + 1.004 * z' ≥ 1 |
| 1, 2, 8 | 1.004 * x' − 2.341 * w' + 5.519 * z' ≥ 1 |
| 2, 3, 8 | x' + 2.86 * w' − 4.00 * z' ≤ 0 |
| 3, 4, 6 | 10.009 * x' + 0.9653 * w' + 0.2502 * z' ≤ 5 |
| 3, 6, 8 | 2.212 * x' + 2.212 * w' − 0.808 * z' ≤ 1 | and the crystalline microporous metalloalumino(gallo)phosphosilicate molecular sieve is characterized by a specific x-ray diffraction pattern. An embodiment of the invention is one, any or all of prior embodiments in this paragraph up through the first embodiment in this paragraph wherein in the metalloalumino(gallo)phosphosilicate material E is aluminum. An embodiment of the invention is one, any or all of prior embodiments in this paragraph up through the first embodiment in this paragraph wherein in the metalloalumino(gallo)phosphosilicate material E is gallium. An embodiment of the invention is one, any or all of prior embodiments in this paragraph up through the first embodiment in this paragraph wherein in the metalloalumino(gallo)phosphosilicate material R is at least one quaternary ammonium cation selected from the group consisting of tetramethylammonium (TMA$^+$), ethyltrimethylammonium (ETMA$^+$), propyltrimethylammonium (PTMA$^+$), isopropyltrimethylammonium, diethyldimethylammonium (DEDMA$^+$), trimethylbutylammonium (TMBA$^+$), methyltriethylammonium (MTEA$^+$), propylethyldimethylammonium (PEDMA$^+$), N,N-dimethylpiperidinium, N,N-dimethyl-3,5-dimethylpiperidinium, dipropyldimethylammonium (DPDMA$^+$), diethylmethylpropylammonium, trimethylpentylammonium (TMPA$^+$), dimethyldiisopropylammonium, tetraethylammonium (TEA$^+$), hexyltrimethylammonium (HTMA$^+$), methylethyldipropylammonium, triethylpropylammonium, dibutyldimethylammonium, benzyltrimethylammonium (BzTMA$^+$), diethyldipropylammonium, octyltrimethylammonium, tetrapropylammonium (TPA$^+$), decyltrimethylammonium, adamantyltrimethylammonium, methyltributylammonium, dodecyltrimethylammonium, hexadecyltrimethylammonium, tetrabutylammonium (TBA$^+$) and mixtures thereof. An embodiment of the invention is one, any or all of prior embodiments in this paragraph up through the first embodiment in this paragraph wherein in the metalloalumino(gallo)phosphosilicate material R is at least one diquaternary ammonium cation selected from the group consisting of methylene-bis-(trimethylammonium), bis-1,2-(trimethylammonium)ethylene, bis-1,3(trimethylammonium)propane, bis-1,3-(trimethylammonium)-2-propanol, bis-1,4-(trimethylammonium)butane, bis-1,5-(trimethylammonium)pentane (i.e., pentamethonium), bis-1,6-(trimethylammonium) hexane (i.e., hexamethonium, HM$^{2+}$), bis-1,8-(trimethylammonium)octane, bis-1,10-(trimethylammonium)decane, bis-1,5-(triethylammonium)pentane (i.e., pentaethonium), bis-1,6-(triethylammonium)hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-1,5-(N-methylpiperidinum)pentane and bis-1,6-(N-methylpiperidinum)hexane, N,N,N',N'-tetramethyl-N,N'-p-xyleno-1,6-hexanediammonium, N,N,N', N'-tetramethyl-N,N'-butano-1,6-hexanediammonium, N,N, N',N'-tetramethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1, 2-ethylenediammonium, N,N,N',N'-tetramethyl-N,N'-hexano-1,2-ethylenediammonium and mixtures thereof. An embodiment of the invention is one, any or all of prior embodiments in this paragraph up through the first embodiment in this paragraph wherein in the metalloalumino(gallo)phosphosilicate material R is at least one triquaternary ammonium cation selected from the group consisting of tris-1,3,5-(triethylammoniomethyl)benzene, tris-1,3,5-(trimethylammoniomethyl)benzene, tris-1,3,5-(dimethylethylammoniomethyl)benzene and mixtures thereof. An embodiment of the invention is one, any or all of prior embodiments in this paragraph up through the first embodiment in this paragraph wherein in the metalloalumino(gallo) phosphosilicate material R is at least one quatroquaternary ammonium cation selected from the group consisting of [(C$_6$H$_5$CH$_2$)(Me$_2$)N(—CH$_2$CH(OH)CH$_2$N(Me$_2$)-)$_3$CH$_2$ C$_6$H$_5$]$^{4+}$ (i.e., dibenzylquatroquat), tetrakis-1,2,4,5-(trimethylammoniomethyl)benzene, tetrakis-1,2,4,5-(triethylammoniomethyl)benzene, tetrakis-1,2,4,5-(dimethylethylammoniomethyl)benzene and mixtures thereof. An embodiment of the invention is one, any or all of prior embodiments in this paragraph up through the first embodiment in this paragraph wherein a crystalline modified form of the crystalline microporous metalloalumino(gallo)phosphosilicate comprises a three-dimensional framework of [M$^{2+}$O$_{4/2}$]$^{2-}$, [EO$_{4/2}$]$^-$, [PO$_{4/2}$]$^+$ and SiO$_{4/2}$ tetrahedral units and derived by modifying the crystalline microporous metalloalumino(gallo)phosphosilicate, the modifications including calcination, ammonia calcinations, ion-exchange, steaming, various acid extractions, ammonium hexafluorosilicate treatment, or any combination thereof.

A second embodiment of the invention is a method for preparing a microporous crystalline metalloalumino(gallo) phosphosilicate material having a three-dimensional framework of [M$^{2+}$O$_{4/2}$]$^{2-}$, [EO$_{4/2}$]$^-$, [PO$_{4/2}$]$^+$ and SiO$_{4/2}$ tetrahedral units and an empirical composition in the as synthesized form and on an anhydrous basis expressed by an empirical formula of R$^{p-}_r$A$^+_m$M$^{2+}_w$E$_x$PSi$_y$O$_z$ where R is at least one of any quaternary ammonium cation, diquaternary ammonium cation triquaternary ammonium cation, quatroquaternary ammonium cation and mixtures thereof, "r" is the mole ratio of R to P and has a value of about 0.04 to about 4.0, "p" is the weighted average valence of R and varies from 1 to 4, A is an alkali metal selected from the group consisting of Li$^+$, Na$^+$, K$^+$, Rb$^+$ and Cs$^+$ and mixtures thereof, "m" is the mole ratio of A to P and varies from 0.04 to 4.0, M is a divalent metal selected from the group Zn, Co, Mg, Mn and mixtures thereof, "w" is the mole ratio of M to P and varies from 0.00268 to 1.35, E is a trivalent element selected from the group consisting of aluminum and gallium and mixtures thereof, "x" is the mole ratio of E to P and varies from 0.1 to 4.0, "y" is the mole ratio of Si to P and varies from 0.008 to about 4.5, and "z" is the mole ratio of O to P and has a value determined by the equation z=(m+p·r+2·w+3·x+5+4·y)/2 where the T-atom compositions for M("w"), E("x"), Si("y") and P(1) are further constrained when expressed as the mole fraction composition M$^{2+}_{w'}$Al$_{w'}$Si$_{y'}$P$_{z'}$, where w'=w/(w+x+y+1), x'=x/(w+x+y+1), y'=y/(w+x+y+1), z'=1/(w+x+y+1) and w'+x'+y'+z'=1, such that the plot of the allowed values of w', x', y' and z' in a quaternary phase diagram conforms to a composition bound by the 8-vertex, 10-sided polyhedron shown in FIG. 1 consisting of the eight vertices whose coordinates are given in Table A:

TABLE A

Vertex Coordinates of MeAPSO Polyhedron

| Vertex | x' (Al) | w' (Me$^{2+}$) | z' (P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 | and defined by the plane equation/inequalities given in Table B:

TABLE B

MeAPSO Compositions - Criteria for x', w' and z'

| Plane Vertices | Plane Equation/Inequalities |
|---|---|
| 1, 2, 3, 4 | w' ≥ 0.001502 |
| 5, 6, 7, 8 | x' + w' + z' ≤ 0.996016 |
| 4, 5, 6 | 1.239 * x' + 0.065 * w' + 1.004 * z' ≤ 1 |
| 1, 4, 5 | x' + 2.274 * w' − 1.25 * z' ≥ 0 |
| 1, 5, 7 | 18.471 * x' + 18.471 * w' − 16.463 * z' ≥ 1 |
| 1, 7, 8 | 4.599 * x' + 0.6046 * w' + 1.004 * z' ≥ 1 |
| 1, 2, 8 | 1.004 * x' − 2.341 * w' + 5.519 * z' ≥ 1 |
| 2, 3, 8 | x' + 2.86 * w' − 4.00 * z' ≤ 0 |
| 3, 4, 6 | 10.009 * x' + 0.9653 * w' + 0.2502 * z' ≤ 5 |
| 3, 6, 8 | 2.212 * x' + 2.212 * w' − 0.808 * z' ≤ 1 | and the crystalline microporous metalloalumino(gallo)phosphosilicate molecular sieve is characterized by a specific x-ray diffraction pattern, the process comprising forming a reaction mixture containing reactive sources of R, A, E, P, M and Si, and heating the reaction mixture at a temperature of about 60° C. to about 200° C. for a time sufficient to form the metalloalumino(gallo)phosphosilicate molecular sieve, the reaction mixture having a composition expressed in terms of mole ratios of the oxides of $aR_{2/p}O$ $bM_2O$ $cMO$ $E_2O_3$ $dP_2O_5$ $eSiO_2$ $fH2O$ where "a" has a value of about 2.1 to about 120, "b" has a value of about 0.1 to about 8, "c" has a value of about 0.01 to about 8, "d" has a value of about 1.69 to about 30, "e" has a value from 0.01 to about 16 and "f" has a value from 50 to about 5000. An embodiment of the invention is one, any or all of prior embodiments in this paragraph up through the second embodiment in this paragraph where the initial reaction mixture is a clear solution before digestion. An embodiment of the invention is one, any or all of prior embodiments in this paragraph up through the second embodiment in this paragraph where A is selected from the group consisting of $Li^+$, $Na^+$, $K^+$, $Rb^+$ and $Cs^+$ and mixtures thereof and the source of A is selected from the group consisting of halide salts, nitrate salts, acetate salts, sulfate salts, hydroxide salts and mixtures thereof. An embodiment of the invention is one, any or all of prior embodiments in this paragraph up through the second embodiment in this paragraph where M is selected from the group consisting of $Zn^{2+}$, $Mn^{2+}$, $Co^{2+}$ and $Mg^{2+}$ and mixtures thereof and the source of M is selected from the group consisting of halide salts, nitrate salts, acetate salts, sulfate salts and mixtures thereof. An embodiment of the invention is one, any or all of prior embodiments in this paragraph up through the second embodiment in this paragraph where the source of E is selected from the group consisting of aluminum isopropoxide, aluminum sec-butoxide, precipitated alumina, $Al(OH)_3$, alkali aluminate salts, aluminum metal, aluminum halide salts, aluminum sulfate salts, aluminum nitrate salts, precipitated gallium oxyhydroxide, gallium nitrate, gallium sulfate and mixtures thereof. An embodiment of the invention is one, any or all of prior embodiments in this paragraph up through the second embodiment in this paragraph where the silicon source is selected from the group consisting of tetraethylorthosilicate, silicon alkoxides, fumed silica, colloidal silica, alkali silicate salts, precipitated silica and mixtures thereof. An embodiment of the invention is one, any or all of prior embodiments in this paragraph up through the second embodiment in this paragraph where the reaction mixture is reacted at a temperature of about 95° C. to about 175° C. for a time of about 1 day to about 14 days.

An embodiment of the invention is one, any or all of prior embodiments in this paragraph up through the second embodiment in this paragraph where R is at least one quaternary ammonium cation selected from the group of quaternary ammonium cations consisting of tetramethylammonium ($TMA^+$), ethyltrimethylammonium ($ETMA^+$), propyltrimethylammonium ($PTMA^+$), isopropyltrimethylammonium, diethyldimethylammonium ($DEDMA^+$), trimethylbutylammonium ($TMBA^+$), methyltriethylammonium ($MTEA^+$), propylethyldimethylammonium ($PEDMA^+$), N,N-dimethylpiperidinium, N,N-dimethyl-3,5-dimethylpiperidinium, dipropyldimethylammonium ($DPDMA^+$), diethylmethylpropylammonium, trimethylpentylammonium (TMPA$^+$), dimethyldiisopropylammonium, tetraethylammonium ($TEA^+$), hexyltrimethylammonium ($HTMA^+$), methylethyldipropylammonium, triethylpropylammonium, dibutyldimethylammonium, benzyltrimethylammonium ($BzTMA^+$), diethyldipropylammonium, octyltrimethylammonium, tetrapropylammonium ($TPA^+$), decyltrimethylammonium, adamantyltrimethylammonium, methyltributylammonium, dodecyltrimethylammonium, hexadecyltrimethylammonium, tetrabutylammonium ($TBA^+$), methylene-bis-(trimethylammonium), bis-1,2-(trimethylammonium)ethylene, bis-1,3(trimethylammonium)propane, bis-1,3-(trimethylammonium)-2-propanol, bis-1,4-(trimethylammonium)butane, bis-1,5-(trimethylammonium)pentane (i.e., pentamethonium), bis-1,6-(trimethylammonium)hexane (i.e., hexamethonium, $HM^{2+}$), bis-1,8-(trimethylammonium)octane, bis-1,10-(trimethylammonium)decane, bis-1,5-(triethylammonium)pentane (i.e., pentaethonium), bis-1,6-(triethylammonium)hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-1,5-(N-methylpiperidinum)pentane and bis-1,6-(N-methylpiperidinum)hexane, N,N,N',N'-tetramethyl-N,N'-p-xyleno-1,6-hexanediammonium, N,N,N',N'-tetramethyl-N,N'-butano-1,6-hexanediammonium, N,N,N',N'-tetramethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1,2-ethylenediammonium, N,N,N',N'-tetramethyl-N,N'-hexano-1,2-ethylenediammonium, tris-1,3,5-(triethylammoniomethyl)benzene, tris-1,3,5-(trimethylammoniomethyl)benzene, tris-1,3,5-(dimethylethylammoniomethyl)benzene, $[(C_6H_5CH_2)(Me_2)N(—CH_2CH(OH)CH_2N(Me_2)—)_3CH_2C_6H_5]^{4+}$ (i.e., dibenzylquatroquat), tetrakis-1,2,4,5-(trimethylammoniomethyl)benzene, tetrakis-1,2,4,5-(triethylammoniomethyl)benzene, tetrakis-1,2,4,5-(dimethylethylammoniomethyl)benzene and mixtures thereof. An embodiment of the invention is one, any or all of prior embodiments in this paragraph up through the second embodiment in this paragraph further comprising adding seeds of a metalloalumino (gallo)phosphosilicate material to the reaction mixture.

A third embodiment of the invention is a hydrocarbon conversion process comprising contacting a hydrocarbon stream with a catalyst at hydrocarbon conversion conditions to generate at least one converted product, wherein the catalyst is selected from the group consisting of a crystalline microporous metalloalumino(gallo)phosphosilicate material, a crystalline microporous modified metalloalumino (gallo)phosphosilicate material and mixtures thereof, where the metalloalumino(gallo)phosphosilicate is a crystalline microporous metalloalumino(gallo)phosphosilicate material having a three-dimensional framework of $[M^{2+}O_{4/2}]^{2-}$, $[EO_{4/2}]^-$, $[PO_{4/2}]^+$ and $SiO_{4/2}$ tetrahedral units and an empirical composition in the as synthesized form and on an anhydrous basis expressed by an empirical formula of $R^{p-}{}_rA^+{}_mM^{2+}{}_wE_xPSi_yO_z$ where R is at least one of any quaternary ammonium cation, diquaternary ammonium cation triquaternary ammonium cation, quatroquaternary ammonium cation and mixtures thereof, "r" is the mole ratio of R to P and has a value of about 0.04 to about 4.0, "p" is the weighted average valence of R and varies from 1 to 4, A is an alkali metal selected from the group consisting of $Li^+$, $Na^+$, $K^+$, $Rb^+$ and $Cs^+$ and mixtures thereof, "m" is the mole ratio of A to P and varies from 0.04 to 4.0, M is a divalent metal selected from the group Zn, Co, Mg, Mn and mixtures thereof, "w" is the mole ratio of M to P and varies from 0.00268 to 1.35, E is a trivalent element selected from the group consisting of aluminum and gallium and mixtures thereof, "x" is the mole ratio of E to P and varies from 0.1 to 4.0, "y" is the mole ratio of Si to P and varies from 0.008 to about 4.5, and "z" is the mole ratio of O to P and has a value determined by the equation $z=(m+p\cdot r+2\cdot w+3\cdot x+5+4\cdot y)/2$ where the T-atom compositions for M("w"), E("x"), Si("y") and P(1) are further constrained when expressed as the mole fraction composition $M^{2+}{}_{w'}Al_{x'}Si_{y'}P_{z'}$, where $w'=w/(w+x+y+1)$, $x'=x/(w+x+y+1)$, $y'=y/(w+x+y+1)$, $z'=1/(w+x+y+1)$ and $w'+x'+y'+z'=1$, such that the plot of the allowed values of w', x', y' and z' in a quaternary phase diagram conforms to a composition bound by the 8-vertex, 10-sided polyhedron shown in FIG. 1 consisting of the eight vertices whose coordinates are given in Table A:

TABLE A

Vertex Coordinates of MeAPSO Polyhedron

| Vertex | x' (Al) | w' (Me$^{2+}$) | z' (P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 | and defined by the plane equation/inequalities given in Table B:

TABLE B

MeAPSO Compositions - Criteria for x', w' and z'

| Plane Vertices | Plane Equation/Inequalities |
|---|---|
| 1, 2, 3, 4 | w' ≥ 0.001502 |
| 5, 6, 7, 8 | x' + w' + z' ≤ 0.996016 |
| 4, 5, 6 | 1.239 * x' + 0.065 * w' + 1.004 * z' ≤ 1 |
| 1, 4, 5 | x' + 2.274 * w' − 1.25 * z' ≥ 0 |
| 1, 5, 7 | 18.471 * x' + 18.471 * w' − 16.463 * z' ≥ 1 |
| 1, 7, 8 | 4.599 * x' + 0.6046 * w' + 1.004 * z' ≥ 1 |
| 1, 2, 8 | 1.004 * x' − 2.341 * w' + 5.519 * z' ≥ 1 |
| 2, 3, 8 | x' + 2.86 * w' − 4.00 * z' ≤ 0 |
| 3, 4, 6 | 10.009 * x' + 0.9653 * w' + 0.2502 * z' ≤ 5 |
| 3, 6, 8 | 2.212 * x' + 2.212 * w' − 0.808 * z' ≤ 1 | and the crystalline microporous metalloalumino(gallo)phosphosilicate molecular sieve is characterized by a specific x-ray diffraction pattern, and the crystalline microporous modified metalloalumino(gallo)phosphosilicate consists of a three-dimensional framework of $[M^{2+O}{}_{4/2}]^{2-}$, $[EO_{4/2}]^-$, $[PO_{4/2}]^+$ and $SiO_{4/2}$ tetrahedral units derived from the metalloalumino-(gallo)phosphosilicate via the modification processes of calcination, ammonia calcinations, ion-exchange, steaming, various acid extractions, ammonium hexafluorosilicate treatment, or any combination thereof. An embodiment of the invention is one, any or all of prior embodiments in this paragraph up through the third embodiment in this paragraph wherein the hydrocarbon conversion process is selected from the group consisting of cracking, hydrocracking, alkylation, isomerization, polymerization, reforming, hydrogenation, dehydrogenation, transalkylation, dealkylation, hydration, dehydration, hydrotreating, hydrofining, hydrodenitrogenation, hydrodesulfurization, methanol to olefins, methanation, syngas shift process, olefin dimerization, oligomerization, dewaxing, and combinations thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A microporous crystalline metalloalumino(gallo)phosphosilicate material having a three-dimensional framework of $[M^{2+}O_{4/2}]^{2-}$, $[EO_{4/2}]^-$, $[PO_{4/2}]^+$ and $SiO_{4/2}$ tetrahedral units and an empirical composition in the as synthesized form and on an anhydrous basis expressed by an empirical formula of:

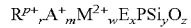

$$R^{p+}{}_rA^+{}_mM^{2+}{}_wE_xPSi_yO_z$$

where R is at least one of any quaternary ammonium cation, diquaternary ammonium cation triquaternary ammonium cation, quatroquaternary ammonium cation and mixtures thereof, "r" is the mole ratio of R to P and has a value of about 0.04 to about 4.0, "p" is the weighted average valence of R and varies from 1 to 4, A is an alkali metal selected from the group consisting of $Li^+$, $Na^+$, $K^+$, $Rb^+$ and $Cs^+$ and mixtures thereof, "m" is the mole ratio of A to P and varies from 0.04 to 4.0, M is a divalent metal selected from the group consisting of Zn, Co, Mg, Mn and mixtures thereof, "w" is the mole ratio of M to P and varies from 0.00268 to 1.35, E is a trivalent element selected from the group consisting of aluminum and gallium and mixtures thereof, "x" is the mole ratio of E to P and varies from 0.1 to 4.0, "y" is the mole ratio of Si to P and varies from 0.008 to about 4.5, and "z" is the mole ratio of O to P and has a value determined by the equation:

$$z=(m+p\cdot r+2\cdot w+3\cdot x+5+4\cdot y)/2$$

where the T-atom compositions for M("w"), E("x"), Si("y") and P(1) are further constrained when expressed as the mole fraction composition $M^{2+}{}_{w'}Al_{x'}Si_{y'}P_{z'}$, where $w'=w/(w+x+y+1)$, $x'=x/(w+x+y+1)$, $y'=y/(w+x+y+1)$, $z'=1/(w+x+y+1)$ and $w'+x'+y'+z'=1$, such that the plot of the allowed values of w', x', y' and z' in a quaternary phase diagram conforms to a composition bound by the 8-vertex, 10-sided polyhedron shown in FIG. 1 consisting of the eight vertices whose coordinates are given in Table A:

TABLE A

Vertex Coordinates of MeAPSO Polyhedron

| Vertex | x' (Al) | w' (Me$^{2+}$) | z' (P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 | and defined by the plane equation/inequalities given in Table B:

TABLE B

MeAPSO Compositions - Criteria for x', w' and z'

| Plane Vertices | Plane Equation/Inequalities |
|---|---|
| 1, 2, 3, 4 | w' ≥ 0.001502 |
| 5, 6, 7, 8 | x' + w' + z' ≤ 0.996016 |
| 4, 5, 6 | 1.239 * x' + 0.065 * w' + 1.004 * z' ≤ 1 |
| 1, 4, 5 | x' + 2.274 * w' − 1.25 * z' ≥ 0 |
| 1, 5, 7 | 18.471 * x' + 18.471 * w' − 16.463 * z' ≥ 1 |
| 1, 7, 8 | 4.599 * x' + 0.6046 * w' + 1.004 * z' ≥ 1 |
| 1, 2, 8 | 1.004 * x' − 2.341 * w' + 5.519 * z' ≥ 1 |
| 2, 3, 8 | x' + 2.86 * w' − 4.00 * z' ≤ 0 |
| 3, 4, 6 | 10.009 * x' + 0.9653 * w' + 0.2502 * z' ≤ 5 |
| 3, 6, 8 | 2.212 * x' + 2.212 * w' − 0.808 * z' ≤ 1 | and the crystalline microporous metalloalumino(gallo)phosphosilicate molecular sieve is characterized by a specific x-ray diffraction pattern.

2. The metalloalumino(gallo)phosphosilicate material of claim 1 where E is aluminum.

3. The metalloalumino(gallo)phosphosilicate material of claim 1 where E is gallium.

4. The metalloalumino(gallo)phosphosilicate material of claim 1 where R is at least one quaternary ammonium cation selected from the group consisting of tetramethylammonium (TMA$^+$), ethyltrimethylammonium (ETMA$^+$), propyltrimethylammonium (PTMA$^+$), isopropyltrimethylammonium, diethyldimethylammonium (DEDMA$^+$), trimethylbutylammonium (TMBA$^+$), methyltriethylammonium (MTEA$^+$), propylethyldimethylammonium (PEDMA$^+$), N,N-dimethylpiperidinium, N,N-dimethyl-3,5-dimethylpiperidinium, dipropyldimethylammonium (DPDMA$^+$), diethylmethylpropylammonium, trimethylpentylammonium (TMPA$^+$), dimethyldiisopropylammonium, tetraethylammonium (TEA$^+$), hexyltrimethylammonium (HTMA$^+$), methylethyldipropylammonium, triethylpropylammonium, dibutyldimethylammonium, benzyltrimethylammonium (BzTMA$^+$), diethyldipropylammonium, octyltrimethylammonium, tetrapropylammonium (TPA$^+$), decyltrimethylammonium, adamantyltrimethylammonium, methyltributylammonium, dodecyltrimethylammonium, hexadecyltrimethylammonium, tetrabutylammonium (TBA$^+$) and mixtures thereof.

5. The metalloalumino(gallo)phosphosilicate material of claim 1 where R is at least one diquaternary ammonium cation selected from the group consisting of methylene-bis-(trimethylammonium), bis-1,2-(trimethylammonium)ethylene, bis-1,3(trimethylammonium)propane, bis-1,3-(trimethylammonium)-2-propanol, bis-1,4-(trimethylammonium) butane, bis-1,5-(trimethylammonium)pentane (i.e., pentamethonium), bis-1,6-(trimethylammonium)hexane (i.e., hexamethonium, HM$^{2+}$), bis-1,8-(trimethylammonium)octane, bis-1,10-(trimethylammonium)decane, bis-1,5-(triethylammonium)pentane (i.e., pentaethonium), bis-1,6-(triethylammonium)hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-1,5-(N-methylpiperidinum)pentane and bis-1,6-(N-methylpiperidinum)hexane, N,N,N',N'-tetramethyl-N,N'-p-xyleno-1,6-hexanediammonium, N,N,N',N'-tetramethyl-N,N'-butano-1,6-hexanediammonium, N,N,N',N'-tetramethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1,2-ethylenediammonium, N,N,N',N'-tetramethyl-N,N'-hexano-1,2-ethylenediammonium and mixtures thereof.

6. The metalloalumino(gallo)phosphosilicate material of claim 1 where R is at least one triquaternary ammonium cation selected from the group consisting of tris-1,3,5-(triethylammoniomethyl)benzene, tris-1,3,5-(trimethylammoniomethyl)benzene, tris-1,3,5-(dimethylethylammoniomethyl)benzene and mixtures thereof.

7. The metalloalumino(gallo)phosphosilicate material of claim 1 where R is at least one quatroquaternary ammonium cation selected from the group consisting of [(C$_6$H$_5$CH$_2$)(Me$_2$)N(—CH$_2$CH(OH)CH$_2$N(Me$_2$)-)$_3$CH$_2$C$_6$H$_5$]$^{4+}$ (i.e., dibenzylquatroquat), tetrakis-1,2,4,5-(trimethylammoniomethyl)benzene, tetrakis-1,2,4,5-(triethylammoniomethyl) benzene, tetrakis-1,2,4,5-(dimethylethylammoniomethyl) benzene and mixtures thereof.

8. A method for preparing a microporous crystalline metalloalumino(gallo)phosphosilicate material having a three-dimensional framework of [M$^{2+}$O$_{4/2}$]$^{2-}$, [EO$_{4/2}$]$^-$, [PO$_{4/2}$]$^+$ and SiO$_{4/2}$ tetrahedral units and an empirical composition in the as synthesized form and on an anhydrous basis expressed by an empirical formula of:

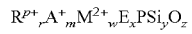

$$R^{p+}_rA^+_mM^{2+}_wE_xPSi_yO_z$$

where R is at least one of any quaternary ammonium cation, diquaternary ammonium cation triquaternary ammonium cation, quatroquaternary ammonium cation and mixtures thereof, "r" is the mole ratio of R to P and has a value of about 0.04 to about 4.0, "p" is the weighted average valence of R and varies from 1 to 4, A is an alkali metal selected from the group consisting of Li$^+$, Na$^+$, K$^+$, Rb$^+$ and Cs$^+$ and mixtures thereof, "m" is the mole ratio of A to P and varies from 0.04 to 4.0, M is a divalent metal selected from the group Zn, Co, Mg, Mn and mixtures thereof, "w" is the mole ratio of M to P and varies from 0.00268 to 1.35, E is a trivalent element selected from the group consisting of aluminum and gallium and mixtures thereof, "x" is the mole ratio of E to P and varies from 0.1 to 4.0, "y" is the mole ratio of Si to P and varies from 0.008 to about 4.5, and "z" is the mole ratio of O to P and has a value determined by the equation:

$$z=(m+p\cdot r+2\cdot w+3\cdot x+5+4\cdot y)/2$$

where the T-atom compositions for M("w"), E("x"), Si("y") and P(1) are further constrained when expressed as the mole fraction composition M$^{2+}_{w'}$Al$_{x'}$Si$_{y'}$P$_{z'}$, where w'=w/(w+x+y+1), x'=x/(w+x+y+1), y'=y/(w+x+y+1), z'=1/(w+x+y+1) and w'+x'+y'+z'=1, such that the plot of the allowed values of w', x', y' and z' in a quaternary phase diagram conforms to a composition bound by the 8-vertex, 10-sided polyhedron shown in FIG. 1 consisting of the eight vertices whose coordinates are given in Table A:

TABLE A

Vertex Coordinates of MeAPSO Polyhedron

| Vertex | x' (Al) | w' ($Me^{2+}$) | z' (P) |
|---|---|---|---|
| 1 | 0.18499 | 0.00105 | 0.14799 |
| 2 | 0.42061 | 0.00105 | 0.10515 |
| 3 | 0.49637 | 0.00105 | 0.12409 |
| 4 | 0.48968 | 0.00105 | 0.39174 |
| 5 | 0.39841 | 0.09960 | 0.49800 |
| 6 | 0.47801 | 0.11952 | 0.39841 |
| 7 | 0.04980 | 0.44821 | 0.49801 |
| 8 | 0.05976 | 0.53785 | 0.39841 | and defined by the plane equation/inequalities given in Table B:

TABLE B

MeAPSO Compositions - Criteria for x', w' and z'

| Plane Vertices | Plane Equation/Inequalities |
|---|---|
| 1, 2, 3, 4 | w' ≥ 0.001502 |
| 5, 6, 7, 8 | x' + w' + z' ≤ 0.996016 |
| 4, 5, 6 | 1.239 * x' + 0.065 * w' + 1.004 * z' ≤ 1 |
| 1, 4, 5 | x' + 2.274 * w' − 1.25 * z' ≥ 0 |
| 1, 5, 7 | 18.471 * x' + 18.471 * w' − 16.463 * z' ≥ 1 |
| 1, 7, 8 | 4.599 * x' + 0.6046 * w' + 1.004 * z' ≥ 1 |
| 1, 2, 8 | 1.004 * x' − 2.341 * w' + 5.519 * z' ≥ 1 |
| 2, 3, 8 | x' + 2.86 * w' − 4.00 * z' ≤ 0 |
| 3, 4, 6 | 10.009 * x' + 0.9653 * w' + 0.2502 * z' ≤ 5 |
| 3, 6, 8 | 2.212 * x' + 2.212 * w' − 0.808 * z' ≤ 1 | and the crystalline microporous metalloalumino(gallo)phosphosilicate molecular sieve is characterized by a specific x-ray diffraction pattern, the process comprising forming a reaction mixture containing reactive sources of R, A, E, P, M and Si, and heating the reaction mixture at a temperature of about 60° C. to about 200° C. for a time sufficient to form the metalloalumino(gallo)phosphosilicate molecular sieve, the reaction mixture having a composition expressed in terms of mole ratios of the oxides of:

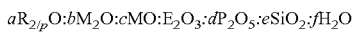

$aR_{2/p}O:bM_2O:cMO:E_2O_3:dP_2O_5:eSiO_2:fH_2O$ where "a" has a value of about 2.1 to about 120, "b" has a value of about 0.1 to about 8, "c" has a value of about 0.01 to about 8, "d" has a value of about 1.69 to about 30, "e" has a value from 0.01 to about 16 and "f" has a value from 50 to about 5000.

9. The method of claim 8 where the initial reaction mixture is a clear solution before digestion.

10. The method of claim 8 where A is selected from the group consisting of $Li^+$, $Na^+$, $K^+$, $Rb^+$ and $Cs^+$ and mixtures thereof and the source of A is selected from the group consisting of halide salts, nitrate salts, acetate salts, sulfate salts, hydroxide salts and mixtures thereof.

11. The method of claim 8 where M is selected from the group consisting of $Zn^{2+}$, $Mn^{2+}$, $Co^{2+}$ and $Mg^{2+}$ and mixtures thereof and the source of M is selected from the group consisting of halide salts, nitrate salts, acetate salts, sulfate salts and mixtures thereof.

12. The method of claim 8 where the source of E is selected from the group consisting of aluminum isopropoxide, aluminum sec-butoxide, precipitated alumina, $Al(OH)_3$, alkali aluminate salts, aluminum metal, aluminum halide salts, aluminum sulfate salts, aluminum nitrate salts, precipitated gallium oxyhydroxide, gallium nitrate, gallium sulfate and mixtures thereof.

13. The method of claim 8 where the silicon source is selected from the group consisting of tetraethylorthosilicate, silicon alkoxides, fumed silica, colloidal silica, alkali silicate salts, precipitated silica and mixtures thereof.

14. The method of claim 8 where the reaction mixture is reacted at a temperature of about 95° C. to about 175° C. for a time of about 1 day to about 14 days.

15. The method of claim 8 where R is at least one quaternary ammonium cation selected from the group of quaternary ammonium cations consisting of tetramethylammonium ($TMA^+$), ethyltrimethylammonium ($ETMA^+$), propyltrimethylammonium ($PTMA^+$), isopropyltrimethylammonium, diethyldimethylammonium ($DEDMA^+$), trimethylbutylammonium ($TMBA^+$), methyltriethylammonium ($MTEA^+$), propylethyldimethylammonium ($PEDMA^+$), N,N-dimethylpiperidinium, N,N-dimethyl-3,5-dimethylpiperidinium, dipropyldimethylammonium ($DPDMA^+$), diethylmethylpropylammonium, trimethylpentylammonium ($TMPA^+$), dimethyldiisopropylammonium, tetraethylammonium ($TEA^+$), hexyltrimethylammonium ($HTMA^+$), methylethyldipropylammonium, triethylpropylammonium, dibutyldimethylammonium, benzyltrimethylammonium ($BzTMA^+$), diethyldipropylammonium, octyltrimethylammonium, tetrapropylammonium ($TPA^+$), decyltrimethylammonium, adamantyltrimethylammonium, methyltributylammonium, dodecyltrimethylammonium, hexadecyltrimethylammonium, tetrabutylammonium ($TBA^+$), methylene-bis-(trimethylammonium), bis-1,2-(trimethylammonium)ethylene, bis-1,3(trimethylammonium)propane, bis-1,3-(trimethylammonium)-2-propanol, bis-1,4-(trimethylammonium)butane, bis-1,5-(trimethylammonium)pentane (i.e., pentamethonium), bis-1,6-(trimethylammonium)hexane (i.e., hexamethonium, $HM^{2+}$), bis-1,8-(trimethylammonium)octane, bis-1,10-(trimethylammonium)decane, bis-1,5-(triethylammonium)pentane (i.e., pentaethonium), bis-1,6-(triethylammonium)hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-1,5-(N-methylpiperidinum)pentane and bis-1,6-(N-methylpiperidinum)hexane, N,N,N',N'-tetramethyl-N,N'-p-xyleno-1,6-hexanediammonium, N,N,N',N'-tetramethyl-N,N'-butano-1,6-hexanediammonium, N,N,N',N'-tetrmaethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1,2-ethylenediammonium, N,N,N',N'-tetramethyl-N,N'-hexano-1,2-ethylenediammonium, tris-1,3,5-(triethylammoniomethyl)benzene, tris-1,3,5-(trimethylammoniomethyl)benzene, tris-1,3,5-(dimethylethylammoniomethyl)benzene, $[(C_6H_5CH_2)(Me_2)N(-CH_2CH(OH)CH_2N(Me_2)-)_3CH_2C_6H_5]^{4+}$ (i.e., dibenzylquatroquat), tetrakis-1,2,4,5-(trimethylammoniomethyl)benzene, tetrakis-1,2,4,5-(triethylammoniomethyl)benzene, tetrakis-1,2,4,5-(dimethylethylammoniomethyl)benzene and mixtures thereof.

16. The method of claim 8 further comprising adding seeds of a metalloalumino(gallo)phosphosilicate material to the reaction mixture.

* * * * *